US 8,639,858 B2

(12) United States Patent
Craddock et al.

(10) Patent No.: US 8,639,858 B2
(45) Date of Patent: Jan. 28, 2014

(54) RESIZING ADDRESS SPACES CONCURRENT TO ACCESSING THE ADDRESS SPACES

(75) Inventors: David Craddock, New Paltz, NY (US); Thomas A. Gregg, Highland, NY (US); Dan F. Greiner, San Jose, CA (US); Donald W. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 12/821,172

(22) Filed: Jun. 23, 2010

(65) Prior Publication Data
US 2011/0320644 A1 Dec. 29, 2011

(51) Int. Cl.
*G06F 13/28* (2006.01)

(52) U.S. Cl.
USPC .......................................................... 710/22

(58) Field of Classification Search
USPC .......................................................... 710/22
See application file for complete search history.

(56) References Cited

U.S. PATENT DOCUMENTS

| 4,028,668 | A | 6/1977 | Riikonen |
| 4,323,963 | A | 4/1982 | Wu |
| 5,053,952 | A | 10/1991 | Koopman, Jr. et al. |
| 5,170,472 | A | 12/1992 | Cwiakala et al. |
| 5,265,240 | A | 11/1993 | Galbraith et al. |
| 5,282,274 | A | 1/1994 | Liu |
| 5,430,856 | A | 7/1995 | Kinoshita |
| 5,465,332 | A | 11/1995 | Deloye et al. |
| 5,465,355 | A | 11/1995 | Cook et al. |
| 5,535,352 | A | 7/1996 | Bridges et al. |
| 5,551,013 | A | 8/1996 | Beausoleil et al. |
| 5,574,873 | A | 11/1996 | Davidian |
| 5,600,805 | A | 2/1997 | Fredericks et al. |
| 5,617,554 | A | 4/1997 | Alpert et al. |
| 5,742,785 | A | 4/1998 | Stone et al. |
| 5,761,448 | A | 6/1998 | Adamson et al. |
| 5,790,825 | A | 8/1998 | Traut |
| 5,802,590 | A | 9/1998 | Draves |
| 5,819,053 | A | 10/1998 | Goodrum et al. |
| 5,822,616 | A | 10/1998 | Hirooka |
| 5,826,084 | A | 10/1998 | Brooks et al. |

(Continued)

FOREIGN PATENT DOCUMENTS

| EP | 0076921 A2 | 4/1983 |
| EP | 0552873 A1 | 7/1993 |

(Continued)

OTHER PUBLICATIONS

Discussion #8 Topics: Paging, Multilevel Paging Kamil et al. Mar. 11, 2004.*

(Continued)

*Primary Examiner* — Henry Tsai
*Assistant Examiner* — Eric Oberly
(74) *Attorney, Agent, or Firm* — John E. Campbell; Blanche E. Schiller, Esq.; Heslin Rothenberg Farley & Mesiti P.C.

(57) ABSTRACT

Address spaces are resized concurrent to accessing those address spaces. The size of an address space can be increased or decreased concurrent to performing read or write operations on the address space. Further, cache entries associated with an address space being decreased in size are purged.

22 Claims, 25 Drawing Sheets

(56) References Cited

U.S. PATENT DOCUMENTS

| | | |
|---|---|---|
| 5,838,960 A | 11/1998 | Harriman, Jr. |
| 5,870,598 A | 2/1999 | White et al. |
| 5,875,463 A | 2/1999 | Crump et al. |
| 5,901,312 A | 5/1999 | Radko |
| 5,960,213 A | 9/1999 | Wilson |
| 5,974,440 A | 10/1999 | Brooks et al. |
| 6,009,261 A | 12/1999 | Scalzi et al. |
| 6,023,736 A | 2/2000 | Lambeth et al. |
| 6,067,595 A | 5/2000 | Lindenstruth |
| 6,078,970 A | 6/2000 | Nordstrom et al. |
| 6,205,530 B1 | 3/2001 | Kang |
| 6,308,255 B1 | 10/2001 | Gorishek, IV et al. |
| 6,330,647 B1 | 12/2001 | Jeddeloh et al. |
| 6,330,656 B1 | 12/2001 | Bealkowski et al. |
| 6,349,380 B1 | 2/2002 | Shahidzadeh et al. |
| 6,408,347 B1 | 6/2002 | Smith et al. |
| 6,463,582 B1 | 10/2002 | Lethin et al. |
| 6,493,741 B1 | 12/2002 | Emer et al. |
| 6,519,645 B2 | 2/2003 | Markos et al. |
| 6,529,978 B1 | 3/2003 | Eide et al. |
| 6,557,035 B1 | 4/2003 | McKnight |
| 6,578,191 B1 | 6/2003 | Boehme et al. |
| 6,581,130 B1 * | 6/2003 | Brinkmann et al. .......... 710/306 |
| 6,615,305 B1 | 9/2003 | Olesen et al. |
| 6,629,175 B1 | 9/2003 | Manning et al. |
| 6,654,818 B1 | 11/2003 | Thurber |
| 6,658,521 B1 | 12/2003 | Biran et al. |
| 6,704,831 B1 | 3/2004 | Avery |
| 6,715,011 B1 | 3/2004 | Buckland et al. |
| 6,721,839 B1 | 4/2004 | Bauman et al. |
| 6,772,097 B1 | 8/2004 | Kromenaker et al. |
| 6,772,264 B1 | 8/2004 | Dayan et al. |
| 6,792,492 B1 | 9/2004 | Griffin |
| 6,820,164 B2 | 11/2004 | Holm et al. |
| 6,901,537 B2 | 5/2005 | Dawkins et al. |
| 6,907,510 B2 | 6/2005 | Bennett et al. |
| 6,963,940 B1 | 11/2005 | Glassen et al. |
| 6,968,446 B1 | 11/2005 | McGrath |
| 6,970,992 B2 | 11/2005 | Gurumoorthy et al. |
| 6,978,338 B2 | 12/2005 | Wang et al. |
| 6,996,638 B2 | 2/2006 | Brice, Jr. et al. |
| 7,065,598 B2 | 6/2006 | Connor et al. |
| 7,107,384 B1 | 9/2006 | Chen et al. |
| 7,127,599 B2 | 10/2006 | Brice, Jr. et al. |
| 7,130,938 B2 | 10/2006 | Brice, Jr. et al. |
| 7,139,940 B2 | 11/2006 | Arbeitman et al. |
| 7,174,550 B2 | 2/2007 | Brice, Jr. et al. |
| 7,177,961 B2 | 2/2007 | Brice, Jr. et al. |
| 7,200,704 B2 | 4/2007 | Njoku et al. |
| 7,209,994 B1 | 4/2007 | Klaiber et al. |
| 7,225,287 B2 | 5/2007 | Wooten |
| 7,260,664 B2 | 8/2007 | Arndt et al. |
| 7,277,968 B2 | 10/2007 | Brice, Jr. et al. |
| 7,296,120 B2 | 11/2007 | Corrigan et al. |
| 7,302,692 B2 | 11/2007 | Bae et al. |
| 7,334,107 B2 * | 2/2008 | Schoinas et al. .............. 711/207 |
| 7,340,582 B2 | 3/2008 | Madukkarumukumana |
| 7,380,041 B2 | 5/2008 | Belmar et al. |
| 7,398,343 B1 | 7/2008 | Marmash et al. |
| 7,412,488 B2 | 8/2008 | Jha et al. |
| 7,418,572 B2 | 8/2008 | Hepkin |
| 7,420,931 B2 | 9/2008 | Nanda et al. |
| 7,444,493 B2 | 10/2008 | Schoinas et al. |
| 7,454,548 B2 | 11/2008 | Belmar et al. |
| 7,464,191 B2 | 12/2008 | Arndt et al. |
| 7,464,209 B2 | 12/2008 | Armstrong et al. |
| 7,475,183 B2 | 1/2009 | Traut et al. |
| 7,493,425 B2 | 2/2009 | Arndt et al. |
| 7,496,707 B2 | 2/2009 | Freking et al. |
| 7,502,872 B2 | 3/2009 | Boyd et al. |
| 7,506,087 B2 | 3/2009 | Ho et al. |
| 7,509,391 B1 | 3/2009 | Chauvel et al. |
| 7,529,860 B2 | 5/2009 | Freimuth et al. |
| 7,530,071 B2 | 5/2009 | Billau et al. |
| 7,546,406 B2 | 6/2009 | Armstrong et al. |
| 7,546,487 B2 | 6/2009 | Marisetty et al. |
| 7,549,090 B2 | 6/2009 | Bailey et al. |
| 7,552,298 B2 | 6/2009 | Bestler |
| 7,562,366 B2 | 7/2009 | Pope et al. |
| 7,567,567 B2 | 7/2009 | Muller et al. |
| 7,587,531 B2 | 9/2009 | Brice, Jr. et al. |
| 7,600,053 B2 | 10/2009 | Carlson et al. |
| 7,606,965 B2 | 10/2009 | Njoku et al. |
| 7,613,847 B2 | 11/2009 | Kjos et al. |
| 7,617,340 B2 | 11/2009 | Gregg |
| 7,617,345 B2 | 11/2009 | Clark et al. |
| 7,623,460 B2 | 11/2009 | Miyazaki |
| 7,624,235 B2 | 11/2009 | Wadhawan et al. |
| 7,627,723 B1 | 12/2009 | Buck et al. |
| 7,631,097 B2 | 12/2009 | Moch et al. |
| 7,886,086 B2 | 2/2011 | Sharma et al. |
| 2001/0021971 A1 | 9/2001 | Gibson et al. |
| 2002/0152334 A1 | 10/2002 | Holm et al. |
| 2002/0161907 A1 | 10/2002 | Moon |
| 2003/0056155 A1 | 3/2003 | Austen et al. |
| 2003/0074541 A1 | 4/2003 | Plambeck |
| 2004/0015622 A1 * | 1/2004 | Avery ............................. 710/22 |
| 2004/0025166 A1 | 2/2004 | Adlung et al. |
| 2004/0049600 A1 | 3/2004 | Boyd et al. |
| 2004/0064618 A1 | 4/2004 | Farrell et al. |
| 2004/0073905 A1 | 4/2004 | Emer et al. |
| 2004/0117534 A1 | 6/2004 | Parry et al. |
| 2004/0139304 A1 | 7/2004 | Arimilli et al. |
| 2004/0139305 A1 | 7/2004 | Arimilli et al. |
| 2004/0199700 A1 | 10/2004 | Clayton |
| 2004/0236880 A1 | 11/2004 | Barrett |
| 2005/0033895 A1 | 2/2005 | Lueck et al. |
| 2005/0071472 A1 | 3/2005 | Arndt et al. |
| 2005/0114586 A1 | 5/2005 | Brice, Jr. et al. |
| 2005/0114623 A1 | 5/2005 | Craddock et al. |
| 2005/0289271 A1 | 12/2005 | Martinez et al. |
| 2006/0005083 A1 | 1/2006 | Genden et al. |
| 2006/0064618 A1 | 3/2006 | Wu et al. |
| 2006/0101181 A1 | 5/2006 | Post et al. |
| 2006/0130071 A1 | 6/2006 | Martin et al. |
| 2006/0195617 A1 | 8/2006 | Arndt et al. |
| 2006/0195644 A1 | 8/2006 | Arndt et al. |
| 2006/0230208 A1 | 10/2006 | Gregg et al. |
| 2006/0253619 A1 | 11/2006 | Torudbakken et al. |
| 2006/0281630 A1 | 12/2006 | Bailey et al. |
| 2006/0288130 A1 * | 12/2006 | Madukkarumukumana et al. ............................. 710/22 |
| 2007/0028087 A1 | 2/2007 | Yu et al. |
| 2007/0073955 A1 | 3/2007 | Murray et al. |
| 2007/0136554 A1 | 6/2007 | Biran et al. |
| 2007/0168636 A1 | 7/2007 | Hummel et al. |
| 2007/0168643 A1 | 7/2007 | Hummel et al. |
| 2007/0168644 A1 | 7/2007 | Hummel et al. |
| 2007/0168934 A1 | 7/2007 | Chandrasekharan et al. |
| 2007/0186074 A1 | 8/2007 | Bradford et al. |
| 2007/0226386 A1 | 9/2007 | Sharp et al. |
| 2007/0234018 A1 | 10/2007 | Feiste |
| 2007/0245041 A1 * | 10/2007 | Hua et al. ........................ 710/22 |
| 2007/0260768 A1 | 11/2007 | Bender et al. |
| 2007/0271559 A1 | 11/2007 | Easton et al. |
| 2008/0091851 A1 | 4/2008 | Sierra |
| 2008/0091868 A1 | 4/2008 | Mizrachi et al. |
| 2008/0091915 A1 | 4/2008 | Moertl et al. |
| 2008/0098197 A1 | 4/2008 | Craddock et al. |
| 2008/0114734 A1 | 5/2008 | Suwabe |
| 2008/0114906 A1 | 5/2008 | Hummel et al. |
| 2008/0126648 A1 | 5/2008 | Brownlow et al. |
| 2008/0126652 A1 | 5/2008 | Vembu et al. |
| 2008/0148295 A1 | 6/2008 | Freimuth et al. |
| 2008/0168208 A1 | 7/2008 | Gregg |
| 2008/0222406 A1 | 9/2008 | Tabuchi |
| 2008/0235425 A1 | 9/2008 | Belmar et al. |
| 2009/0024823 A1 | 1/2009 | Ko et al. |
| 2009/0049220 A1 | 2/2009 | Conti et al. |
| 2009/0070760 A1 | 3/2009 | Khatri et al. |
| 2009/0089780 A1 | 4/2009 | Johnson et al. |
| 2009/0125666 A1 | 5/2009 | Freking et al. |
| 2009/0144462 A1 | 6/2009 | Arndt et al. |
| 2009/0144731 A1 | 6/2009 | Brown et al. |

(56) References Cited

U.S. PATENT DOCUMENTS

| | | | |
|---|---|---|---|
| 2009/0172211 | A1 | 7/2009 | Perry et al. |
| 2009/0182966 | A1 | 7/2009 | Greiner et al. |
| 2009/0182969 | A1 | 7/2009 | Norgaard et al. |
| 2009/0210646 | A1 | 8/2009 | Bauman et al. |
| 2009/0222814 | A1 | 9/2009 | Astrand |
| 2009/0240849 | A1 | 9/2009 | Corneli et al. |
| 2009/0249039 | A1 | 10/2009 | Hook et al. |
| 2009/0276774 | A1 | 11/2009 | Kinoshita |
| 2009/0276775 | A1 | 11/2009 | Brown et al. |
| 2009/0328035 | A1 | 12/2009 | Ganguly |
| 2010/0005234 | A1 | 1/2010 | Ganga et al. |
| 2013/0067194 | A1 | 3/2013 | Craddock et al. |

FOREIGN PATENT DOCUMENTS

| | | | |
|---|---|---|---|
| EP | 0902355 | A2 | 3/1999 |
| EP | 0955585 | A2 | 11/1999 |
| EP | 1096376 | A2 | 2/2001 |
| EP | 1489491 | A1 | 12/2004 |
| JP | 57191826 | A | 11/1982 |
| JP | 359081724 | A | 5/1984 |
| JP | 362079557 | A | 4/1987 |
| JP | 405053973 | A | 3/1993 |
| JP | 5100996 | A | 4/1993 |
| WO | WO9600940 | A1 | 1/1996 |
| WO | WO9938074 | A1 | 7/1999 |
| WO | WO02/41157 | A2 | 5/2002 |

OTHER PUBLICATIONS

Paulsen, Eric; "Local Memory Coaxes Top Speed from SCSI Masters," Electronic Design, v. 41, Apr. 15, 1993, pp. 76-6+.
Ganapathy, Narayanan; "General Purpose Operating System Support for Multiple Page Sizes," USENIX Annual Technical Conference (No. 98), 1998, pp. 91-104.
Talluri et al., "A New Page Table for 64-bit Address Spaces," ACM SIGOPS Operating Systems Review, vol. 29, Issue 5 (Dec. 1995), pp. 194-200.
"Large Page Support in the Linux Kernel," http://lwn.net/Articles/6969/ <retrieved on Jan. 26, 2010>.
Crawford, Catherine H. et al., "Accelerating Computing with the Cell Broadband Engine Processor," May 2008, CF '08, May 5-7, 2008, Ischia, Italy, pp. 3-11.
Baumann, Andrew, et al., "The Multikernel: A New OS Architecture for Scalable Multicore Systems," Oct. 2009, SOSP '09, Oct. 11-14, 2009, Big Sky, Montana, USA, pp. 29-43.
Swift, Michael M. et al., "Improving the Reliability of Commodity Operating Systems," ACM Transactions on Computer Systems, vol. 23, No. 1, Feb. 2005, pp. 77-110.
Xu, Min et al., "Towards a VMM-based Usage Control Framework for OS Kernel Integrity Protection," SACMAT '07, Jun. 20-22, 2007, Sophia Antipolis, France, pp. 71-80.
Huang, Wei et al., "A Case for High Performance Computing with Virtual Machines," ISC '06, Jun3 28 30, Carins, Queensland, Australia, pp. 125-134, Jun. 3, 2006.
Mysore, Shashidhar et al., "Understanding and Visualizing Full Systems with Data Flow Tomography," SPOLOS '08, Mar. 1-5, 2008, Seattle, Washington, USA, pp. 211-221.
"DMA Engines Bring Multicast to PCI Express Systems," http://electronicdesign.com, Aug. 13, 2009, 3 pages.
"XEN WIKI," http://wiki.xensource.com/xenwiki/VTdHowTo, 5 pages, Apr. 16, 2010.
Vaidyanathan, K., et al., "Exploiting RDMA Operations for Providing Efficient Fine-Grained Resource Monitoring in Cluster-based Servers," 1-4244-0328—Jun. 2006, 10 pages.
"IBM Enhances the IBM eServer zSeries 990 Family of Servers," Hardware Announcement, Oct. 7, 2003, pp. 1-11.
"Intel® Virtualization Technology for Directed I/O," Intel® Technology Journal, vol. 10, Issue 3, Aug. 10, 2006.
"I/O Virtualization and AMD's IOMMU," AMD Developer Central, http://developer.amd.com/documentation/articles/pages/892006101.aspx, Aug. 9, 2006.
"z/Architecture Principles of Operation," IBM Publication No. SA22-7832-07, Feb. 2009.
"z/VM: Running Guest Operating Systems," IBM Publication No. SC24-5997-02, Oct. 2001.
"z/VM: General Information Manual," IBM Publication No. GC24-5991-05, May 2003.
Winwood, Simon, et al., "Multiple Page Size Support in the Linux Kernel", Proceedings of Ottawa Linux Symposium, 2002.
"z/Architecture Principles of Operation," Chapter 17, pp. 17-1-17-30, IBM Publication No. SA22-7832-07, Feb. 2009.
"Intel® Itanium® Architecture Software Developer's Manual," vol. 2, Rev. 2.2, Jan. 2006.
U.S. Appl. No. 12/708,284, "Load Pair Disjoint Facility and Instruction Therefore," filed Jun. 24, 2010.
U.S. Appl. No. 12/820,735, "High-Word Facility for Extending the Number of General Purpose Registers Available to Instructions," filed Jun. 22, 2010.
U.S. Appl. No. 12/820,768, "Instructions for Performing an Operation on Two Operands and Subsequently Storing an Original Value of Operand," filed Jun. 22, 2010.
U.S. Appl. No. 12/821,224, "Associating Input/Output Device Requests With Memory Associated With a Logical Partition," filed Jun. 21, 2010.
U.S. Appl. No. 12/821,239, "Input/Output (I/O) Expansion Response Processing in a Peripheral Component Interconnect Express (PCIE) Environment," filed Jun. 23, 2010.
U.S. Appl. No. 12/821,242, "A System and Method for Downbound I/O Expansion Request and Response Processing in a PCIe Architecture," filed Jun. 23, 2010.
U.S. Appl. No. 12/821,243, "Upbound Input/Output Expansion Request and Response Processing in a PCIE Architecture," filed Jun. 23, 2010.
U.S. Appl. No. 12/821,245, "A System and Method for Routing I/O Expansion Requests and Responses in a PCIE Architecture," filed Jun. 23, 2010.
U.S. Appl. No. 12/821,247, "Scalable I/O Adapter Function Level Error Detection, Isolation, and Reporting," filed Jun. 23, 2010.
U.S. Appl. No. 12/821,248, "Connected Input/Output HUB Management," filed Jun. 23, 2010.
U.S. Appl. No. 12/821,256, "Switch Failover Control in a Multiprocessor Computer System," filed Jun. 23, 2010.
U.S. Appl. No. 12/821,271, "Memory Error Isolation and Recovery in a Multiprocessor Computer System," filed Jun. 23, 2010.
U.S. Appl. No. 12/822,358, "Function Virtualization Facility for Function Query of a Processor," filed Jun. 24, 2010.
U.S. Appl. No. 12/822,368, "Function Virtualization Facility for Blocking Instruction Function of a Multi-Function Instruction of a Virtual Processor," filed Jun. 24, 2010.
Craddock et al., U.S. Appl. No. 12/821,170, "Translation of Input/Output Address to Memory Addresses" filed Jun. 23, 2010.
Craddock et al., U.S. Appl. No. 12/821,171, "Runtime Determination of Translation Formats for Adapter Functions," filed Jun. 23, 2010.
Craddock et al., U.S. Appl. No. 12/821,174, "Multiple Address Spaces Per Adapter," filed Jun. 23, 2010.
Craddock et al., U.S. Appl. No. 12/821,175, "Converting a Message Signaled Interruption Into an I/O Adapter Event Notification," filed Jun. 23, 2010.
Brice et al., U.S. Appl. No. 12/821,177, "Converting a Message Signaled Interruption Into an I/O Adapter Event Notification to a Guest Operating System," filed Jun. 23, 2010.
Craddock et al., U.S. Appl. No. 12/821,178, "Identification of Types of Sources of Adapter Interruptions," filed Jun. 23, 2010.
Belmar et al., U.S. Appl. No. 12/821,179, "Controlling a Rate at Which Adapter Interruption Requests are Processed," filed Jun. 23, 2010.
Craddock et al., U.S. Appl. No. 12/821,181, "Controlling the Selectively Setting of Operational Parameters for an Adapter," filed Jun. 23, 2010.
Craddock et al., U.S. Appl. No. 12/821,182, "Load Instruction for Communicating With Adapters," filed Jun. 23, 2010.
Craddock et al., U.S. Appl. No. 12/821,184, "Controlling Access by a Configuration to an Adapter Function," filed Jun. 23, 2010.

(56) References Cited

OTHER PUBLICATIONS

Coneski et al., U.S. Appl. No. 12/821,185, "Discovery by Operating System of Information Relating to Adapter Functions Accessible to the Operating System," filed Jun. 23, 2010.
Coneski et al., U.S. Appl. No. 12/821,187, "Enable/Disable Adapters of a Computing Environment," filed Jun. 23, 2010.
Craddock et al., U.S. Appl. No. 12/821,190, "Guest Access to Address Spaces of Adapter," filed Jun. 23, 2010.
Coneski et al., U.S. Appl. No. 12/821,191, "Managing Processing Associated With Hardware Events," filed Jun. 23, 2010.
Craddock et al., U.S. Appl. No. 12/821,192, "Operating System Notification of Actions to Be Taken Responsive to Adapter Events," filed Jun. 23, 2010.
Brice et al., U.S. Appl. No. 12/821,193, "Measurement Facility for Adapter Functions," filed Jun. 23, 2010.
Craddock et al., U.S. Appl. No. 12/821,194, "Store/Store Block Instructions for Communicating With Adapters," filed Jun. 23, 2010.
International Search Report and Written Opinion for PCT/EP2010/067039 dated Feb. 25, 2011.
International Search Report and Written Opinion for PCT/EP2010/067036 dated Feb. 14, 2011.
International Search Report and Written Opinion for PCT/EP2010/067030 dated Feb. 7, 2011.
International Search Report and Written Opinion for PCT/EP2010/067020 dated Apr. 5, 2011.
International Search Report and Written Opinion for PCT/EP2010/067025 dated Apr. 13, 2011.
International Search Report and Written Opinion for PCT/EP2010/067024 dated Apr. 27, 2011.
International Search Report and Written Opinion for PCT/EP2010/067019 dated Apr. 26, 2011.
International Search Report and Written Opinion for PCT/EP2010/067021 dated Apr. 28, 2011.
International Search Report and Written Opinion for PCT/EP2010/067043 dated Apr. 21, 2011.
International Search Report and Written Opinion for PCT/EP2010/067041 dated Apr. 26, 2011.
International Search Report and Written Opinion for PCT/EP2010/067031 dated Apr. 26, 2011.
International Search Report and Written Opinion for PCT/EP2010/067034 dated May 18, 2011.
International Search Report and Written Opinion for PCT/EP2010/067023 dated Jun. 15, 2011.
International Search Report and Written Opinion for PCT/EP2010/067032 dated May 27, 2011.
International Search Report and Written Opinion for PCT/EP2010/067038 dated Jun. 15, 2011.
"Chapter 6: Configuration Space" in PCI-SIG: "PCI Local Bus Specification Revision 3.0", Feb. 2004, pp. 213-254.
Hennet, P. et al., "Programmable Interrupt Vectors in Processors," IBM Technical Disclosure Bulletin, vol. 25, No. 5, Oct. 1, 1982, pp. 2641-2642.
Plambeck et al., "Development and Attributes of z/Architecture," IBM Journal of Research and Development, IBM Corporation, vol. 46, No. 4/05, Jul. 1, 2002, pp. 367-379.
"z/Architecture Principles of Operation, Chapter 3", Feb. 2008, pp. 1-71.
Gehringer, E. F., et al., "Virtual Memory Systems," CSC-506—Architecture of Parallel Computers Computer Science Department, College of Engineering, North Carolina, Dec. 31, 1999, XP002631523.
"z/Architecture—Principles of Operation," IBM Publication No. SA22-7832-05, Sixth Edition, Apr. 2007, Chapter 10, 10-1-10-138.
"PCI Local Bus Specification," Mar. 29, 2002, pp. 1-328.
McGee, H.T., "Technique for Resetting a Single Channel Path Under Operator Control in IBM System/370XA," IBM Technical Disclosure Bulletin, vol. 26, No. 10B, Mar. 1984.
"Decreased Latency Across PCI Express With I/O Virtualization via a Hint Interface," IPCOM000185226D, Jul. 16, 2009, pp. 1-2.
Office Action for U.S. Appl. No. 12/821,171 dated Oct. 7, 2011.
Office Action for U.S. Appl. No. 12/821,182 dated Oct. 13, 2011.
Office Action for U.S. Appl. No. 12/821,184 dated Oct. 18, 2011.
Communication Pursuant to Article 94(3) EPC for Application No. 10 776 350.0-2212 dated Oct. 31, 2012, pp. 1-6.
Final Office Action for U.S. Appl. No. 12/821,174 dated Nov. 13, 2012, pp. 1-29.
Office Action for U.S. Appl. No. 12/821,170 dated Feb. 1, 2013, pp. 1-28.
Office Action for U.S. Appl. No. 13/672,028 dated Feb. 1, 2013, pp. 1-20.
Communication Pursuant to Article 94(3) EPC for Application No. 10 784 272.6-1243 dated Feb. 6, 2013, pp. 1-7.
Final Office Action for U.S. Appl. No. 12/821,171 dated Mar. 18, 2013, pp. 1-11.
Office Action for U.S. Appl. No. 12/821,181 dated Mar. 26, 2013, pp. 1-37.
Notice of Allowance for U.S. Appl. No. 12/821,185 dated Apr. 11, 2013, pp. 1-16.
Office Action for U.S. Appl. No. 12/821,185 dated Dec. 20, 2011.
Office Action for U.S. Appl. No. 12/821,174 dated Jan. 19, 2012.
Final Office Action for U.S. Appl. No. 12/821,184 dated Jan. 24, 2012.
Office Action for U.S. Appl. No. 12/821,193 dated Feb. 24, 2012.
Office Action for U.S. Appl. No. 12/821,187 dated Feb. 28, 2012.
"PCI Local Bus Specification, Revision 3.0," Cover and pp. 39, 44, 48-49 & 58, Aug. 12, 2002.
International Search Report and Written Opinion for PCT/EP2010/067029 dated Mar. 2, 2011.
"IBM System/390 I/O Call Reporting Process," IBM Technical Disclosure Bulletin, vol. 36, No. 1, Jan. 1993, pp. 164-169, XP000222812.
"Means for Channel Subsystem-Initiated Communication," IBM Technical Disclosure Bulletin, vol. 33, No. 12, May 1991, p. 169, XP000121623.
International Search Report and Written Opinion for PCT/EP2010/067028 dated Mar. 8, 2011.
International Search Report and Written Opinion for PCT/EP2010/067042 dated Apr. 28, 2011.
"PCI Local Bus Specification Revision 3.0," Aug. 12, 2002, pp. 39, 44, 48, 49 and 58.
Final Office Action for U.S. Appl. No. 12/821,171 dated Mar. 29, 2012.
Final Office Action for U.S. Appl. No. 12/821,185 dated Jun. 6, 2012.
"Atari PCI BIOS and Device Drive Specification 1.13," Chapters 2, 3, 4 and 6; [online], internet archive dates Dec. 12, 2007 and Feb. 8, 2007; retrieved on May 24, 2012, 13 pages <URL:http://kunden.wvnet.at/fichti/docs/pcibios-2.htm; pcibios-3.htm; pcibios-4.htm, pcibios-6.htm>.
"PCI Device Access Under 32-bit PM DOS from Open Watcom," [online], internet archive date Jul. 19, 2006; retrieved May 26, 2012, 14 pages <URL:http://www.openwatcom.org/index.php/PCI_Device_access_under_32-Bit_PM_DOS>.
Device Identification Strings from OSR online; [online], internet archive date Mar. 13, 2005; retrieved May 26, 2012, 3 pages <URL:http//www.osronline.com/ddkx/install/idstrings_8tt3.htm>.
Office Action for U.S. Appl. No. 12/821,190 dated Jun. 12, 2012.
Office Action for U.S. Appl. No. 12/821,174 dated Jun. 15, 2012.
International Search Report and Written Opinion for PCT/EP2010/067035 dated Mar. 8, 2011.
Final Office Action for U.S. Appl. No. 12/821,187 dated Jul. 16, 2012.
Office Action for U.S. Appl. No. 12/821,171 dated Jul. 19, 2012.
Communication Pursuant to Article 94(3) EPC for Application No. 10 776 345.0-1956, dated May 31, 2013, pp. 1-6.
Communication Pursuant to Article 94(3) EPC for Application No. 10 778 994.3-1960, dated Jul. 3, 2013, pp. 1-7.
Office Action for U.S. Appl. No. 12/821,190 dated Sep. 4, 2013, pp. 1-6.

* cited by examiner

PCI FUNCTION INFORMATION BLOCK (FIB)    850

- FORMAT — 851
- INTERCEPTION CONTROL — 852
- ERROR INDICATION — 854
- LOAD / STORE BLOCKED — 856
- PCI FUNCTION VALID — 858
- ADDRESS SPACE — 860
- PAGE SIZE — 861
- PCI BASE ADDRESS (PBA) — 862
- PCI ADDRESS LIMIT (PAL) — 864
- I/O ADDRESS TRANSLATION (IOAT) POINTER — 866
- INTERRUPTION SUBCLASS (ISC) — 868
- NUMBER OF INTERRUPTIONS — 870
- ADAPTER INTERRUPTION BIT VECTOR (AIBV)@ — 872
- AIBV OFFSET — 874
- ADAPTER INTERRUPTION SUMMARY BIT (AISB)@ — 876
- AISB OFFSET — 878
- FUNCTION MEASUREMENT BLOCK ADDRESS (FMB) — 880
- FMB KEY — 882
- SUMMARY BIT NOTIFICATION CONTROL — 884
- INSTRUCTION AUTHORIZATION TOKEN — 886
- ADDRESS TRANSLATION FORMAT — 887

FIG. 8D

RESIZING ADDRESS SPACES CONCURRENT TO ACCESSING THE ADDRESS SPACES

BACKGROUND

This invention relates, in general, to managing system memory in a computing environment, and in particular, to resizing address spaces of the system memory.

System memory is typically configured as one or more address spaces. An address space is a particular portion of system memory that has been assigned to a particular component of the computing environment, such as a particular adapter or central processing unit. The component assigned to the address space accesses the memory of the address space by issuing read and write requests. Each request includes an address that is to be used to access system memory. In some instances, however, this address does not have a one-to-one correspondence with a physical location in system memory. Therefore, address translation is performed.

Address translation is used to translate an address that is provided in one form not directly usable in accessing system memory to another form that is directly usable in accessing a physical location in system memory. For instance, a virtual address included in a request provided by a central processing unit is translated to a real or absolute address in system memory. As a further example, a Peripheral Component Interconnect (PCI) address provided in a request from an adapter may be translated to an absolute address in system memory.

To perform address translation, one or more address translation tables are used. The tables are configured in a hierarchy, and an entry in the highest level table is located using bits of the address provided in the request. That entry then points to another translation table or to the page, itself, to be accessed.

BRIEF SUMMARY

At times, it is beneficial to resize an address space, and that resizing may effect one or more address translation tables.

Shortcomings of the prior art are overcome and advantages are provided through the provision of a computer program product for managing address spaces. The computer program product includes a computer readable storage medium readable by a processing circuit and storing instructions for execution by the processing circuit for performing a method. The method includes, for instance, concurrent to an adapter accessing a direct memory access (DMA) address space, performing a) and b): a) responsive to executing a Modify PCI Function Controls (MPFC) instruction re-register function that includes a handle for locating an adapter, the MPFC instruction specifying a new DMA address space limit associated with the DMA address; and b) informing the adapter that the DMA address space limit has changed.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 8D depicts one embodiment of the contents of a function information block (FIB) used in accordance with an aspect of the present invention;

DETAILED DESCRIPTION

In accordance with an aspect of the present invention, a capability is provided for resizing address spaces concurrent to those address spaces being accessed. This provides flexibility in the allocation of memory without impacting current operations.

Figure 1:
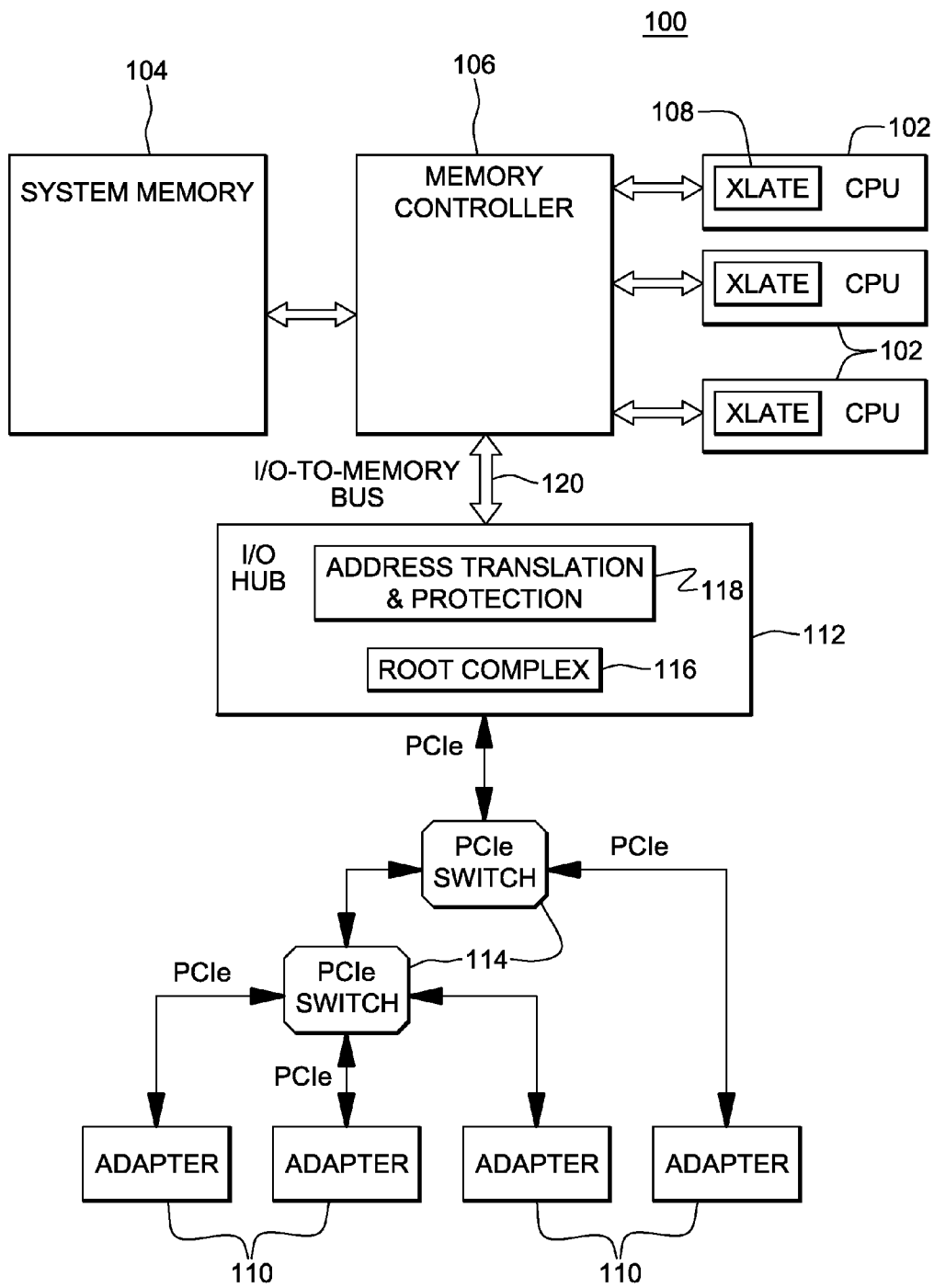
FIG. 1 depicts one embodiment of a computing environment to incorporate and use one or more aspects of the present invention.

One embodiment of a computing environment to incorporate and use one or more aspects of the present invention is described with reference to FIG. 1. In one example, a computing environment 100 is a System z® server offered by International Business Machines Corporation. System z® is based on the z/Architecture® offered by International Business Machines Corporation. Details regarding the z/Architecture® are described in an IBM® publication entitled, "z/Architecture Principles of Operation," IBM Publication No. SA22-7832-07, February 2009, which is hereby incorporated herein by reference in its entirety. IBM®, System z® and z/Architecture® are registered trademarks of International Business Machines Corporation, Armonk, N.Y. Other names used herein may be registered trademarks, trademarks or product names of International Business Machines Corporation or other companies.

In one example, computing environment 100 includes one or more central processing units (CPUs) 102 coupled to a system memory 104 (a.k.a., main memory) via a memory controller 106. To access system memory 104, a central processing unit 102 issues a read or write request that includes an address used to access system memory. The address included in the request is typically not directly usable to access system memory, and therefore, it is translated to an address that is directly usable in accessing system memory. The address is translated via a translation mechanism (XLATE) 108. For example, the address is translated from a virtual address to a real or absolute address using, for instance, dynamic address translation (DAT).

The request, including the translated address, is received by memory controller 106. In one example, memory controller 106 is comprised of hardware and is used to arbitrate for access to the system memory and to maintain the memory's consistency. This arbitration is performed for requests received from CPUs 102, as well as for requests received from one or more adapters 110. Like the central processing units, the adapters issue requests to system memory 104 to gain access to the system memory.

In one example, adapter 110 is a Peripheral Component Interconnect (PCI) or PCI Express (PCIe) adapter that includes one or more PCI functions. A PCI function issues a request that requires access to system memory. The request is routed to an input/output hub 112 (e.g., a PCI hub) via one or more switches (e.g., PCIe switches) 114. In one example, the input/output hub is comprised of hardware, including one or more state machines.

The input/output hub includes, for instance, a root complex 116 that receives the request from a switch. The request includes an input/output address that may need to be translated, and thus, the root complex provides the address to an address translation and protection unit 118. This unit is, for instance, a hardware unit used to translate, if needed, the I/O address to an address directly usable to access system memory 104, as described in further detail below.

The request initiated from the adapter, including the address (translated or initial address, if translation is not needed), is provided to memory controller 106 via, for instance, an I/O-to-memory bus 120. The memory controller performs its arbitration and forwards the request with the address to the system memory at the appropriate time.

As used herein, the term adapter includes any type of adapter (e.g., storage adapter, processing adapter, network adapter, crypto adapter, PCI adapter, other type of input/output adapters, etc.). Moreover, in the examples presented herein, adapter is used interchangeably with adapter function (e.g., PCI function), unless otherwise noted. In one embodiment, an adapter includes one adapter function. However, in other embodiments, an adapter may include a plurality of adapter functions. One or more aspects of the present invention are applicable whether an adapter includes one adapter function or a plurality of adapter functions Further details regarding the system memory and the input/output hub are described with reference to FIG. 2. In this embodiment, the memory controller is not shown. However, the I/O hub may be coupled to the system memory directly or via a memory controller. In one example, system memory 104 includes one or more address spaces 200. An address space is a particular portion of system memory that has been assigned to a particular component of the computing environment, such as a particular adapter. In one example, the address space is accessible by direct memory access (DMA) initiated by the adapter, and therefore, the address space is referred to in the examples herein as a DMA address space. However, in other examples, direct memory access is not used to access the address space.

Further, in one example, system memory 104 includes address translation tables 202 used to translate an address from one that is not directly usable to access system memory to one that is directly usable. In one embodiment, there are one or more address translation tables assigned to a DMA address space, and those one or more address translation tables are configured based on, for instance, the size of the address space to which it is assigned, the size of the address translation tables themselves, and/or the size of the page (or other unit of memory) to be accessed.

Figure 2:
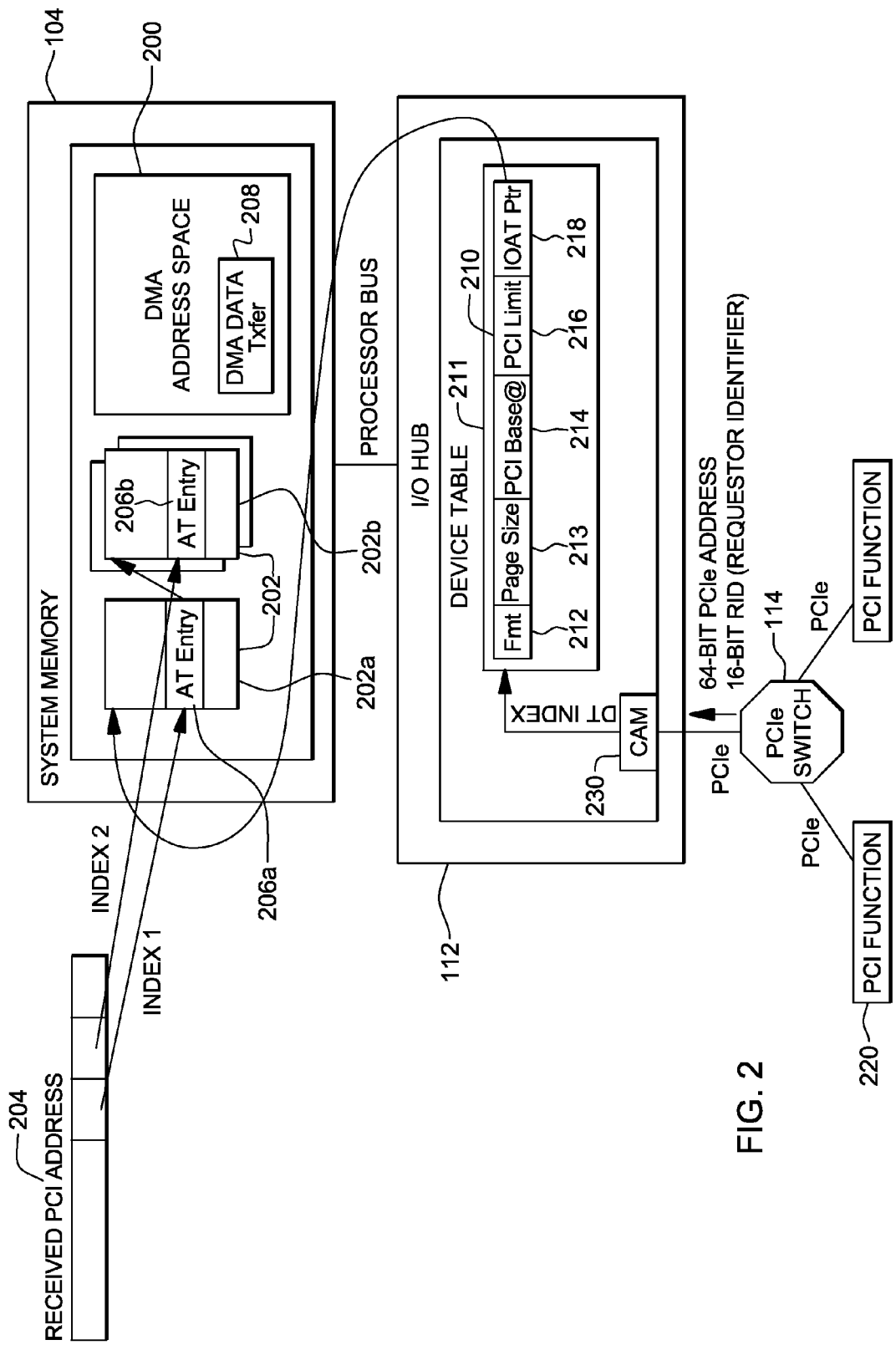
FIG. 2 depicts one embodiment of further details of the system memory and I/O hub of FIG. 1, in accordance with an aspect of the present invention.

In one example, there is a hierarchy of address translation tables. For instance, as shown in FIG. 2, there is a first-level table 202a (e.g., a segment table) pointed to by an IOAT pointer 218 (described below), and a second, lower level table 202b (e.g., a page table) pointed to by an entry 206a of the first-level table. One or more bits of a received address 204 are used to index into table 202a to locate a particular entry 206a, which indicates a particular lower level table 202b. Then, one or more other bits of address 204 are used to locate a particular entry 206b in that table. In this example, that entry provides the address used to locate the correct page and additional bits in address 204 are used to locate a particular location 208 in the page to perform a data transfer. That is, the address in entry 206b and selected bits of received PCI address 204 are used to provide the address directly usable to access system memory. For instance, the directly usable address is formed from a concatenation of high order bits of the address in entry 206b (e.g., bits 63:12, in a 4 k page example) and selected low order bits from the received PCI address (e.g., bits 11:0 for a 4 k page).

In one example, it is an operating system that assigns a DMA address space to a particular adapter. This assignment is performed via a registration process, which causes an initialization (via, e.g., trusted software) of a device table entry 210 for that adapter. The device table entry is located in a device table 211 located in I/O hub 112. For example, device table 211 is located within the address translation and protection unit of the I/O hub.

In one example, device table entry (DTE) 210 includes a number of fields, such as the following:

Format 212: This field includes a plurality of bits to indicate various information, including, for instance, the address translation format (including level) of an upper level table of the address translation tables (e.g., in the example above, the first-level table);

Page Size 213: This field indicates a size of a page (or other unit of memory) to be accessed;

PCI base address 214 and PCI limit 216: These values provide a range used to define a DMA address space and verify a received address (e.g., PCI address) is valid; and IOAT (Input/Output Address Translation) pointer 218: This field includes a pointer to the highest level of address translation table used for the DMA address space.

In other embodiments, the DTE may include more, less or different information.

In one embodiment, the device table entry to be used in a particular translation is located using a requestor identifier (RID) located in a request issued by a PCI function 220 associated with an adapter (and/or by a portion of the address). The requestor id (e.g., a 16-bit value specifying, for instance, a bus number, device number and function number) is included in the request, as well as the I/O address (e.g., a 64-bit PCIe address) to be used to access system memory. The request, including the RID and I/O address, are provided to, e.g., a contents addressable memory (CAM) 230 via, e.g., a switch 114, which is used to provide an index value. For instance, the CAM includes multiple entries, with each entry corresponding to an index into the device table. Each CAM entry includes the value of a RID. If, for instance, the received RID matches the value contained in an entry in the CAM, the corresponding device table index is used to locate the device table entry. That is, the output of the CAM is used to index into device table 211 to locate device table entry 210. If there is no match, the received packet is discarded with no access to system memory being performed. (In other embodiments, a CAM or other look-up is not needed and the RID is used as the index.)

Subsequently, fields within the device table entry are used to ensure the validity of the address and the configuration of the address translation tables. For example, the inbound address in the request is checked by the hardware of the I/O hub to ensure that it is within the bounds defined by PCI base address 214 and PCI limit 216 stored in the device table entry located using the RID of the request that provided the address. This ensures that the address is within the range previously registered and for which address translation tables are validly configured.

Figure 3A:
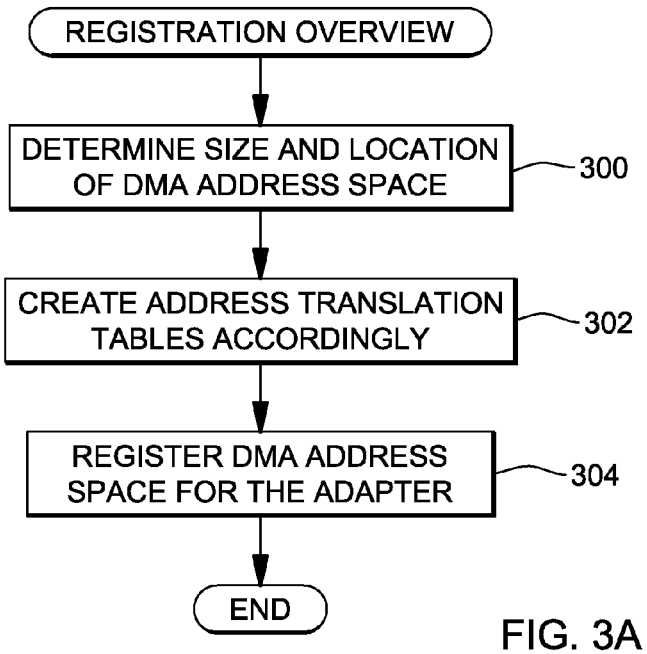
FIG. 3A depicts one embodiment of an overview of the logic to register a DMA (direct memory access) address space for an adapter, in accordance with an aspect of the present invention.

In one embodiment, to translate an I/O address (i.e., an address provided by an adapter or another component of an I/O subsystem) to a system memory address (i.e., an address directly usable to access system memory), initially, a registration process is performed. One example of an overview of this registration process is described with reference to FIG. 3A.

Initially, an operating system executing within one of the central processing units coupled to system memory determines a size and location of the address space that the adapter is to access, STEP 300. In one example, the size of the address space is determined by the PCI base address and PCI limit set by the operating system. The operating system determines the base and limit using one or more criteria. For instance, if the operating system wishes to have PCI addresses map directly to CPU virtual addresses, then the base and limit are set as such. In a further example, if additional isolation between adapters and/or operating system images is desired, then the addresses being used are selected to provide non-overlapping and disjoint address spaces. The location is also specified by the operating system, and is based, for instance, on the characteristics of the adapter.

Thereafter, one or more address translation tables are created to cover that DMA address space, STEP 302. As examples, the tables can be compatible with CPU address translation tables or a unique format can be provided that is supported by the input/output hub. In one example, the creation includes building the tables and placing the appropriate addresses within the table entries. As an example, one of the translation tables is a 4 k page table having 512 64-bit entries, and each entry includes a 4 k page address compatible with the assigned address space.

Figure 3B:
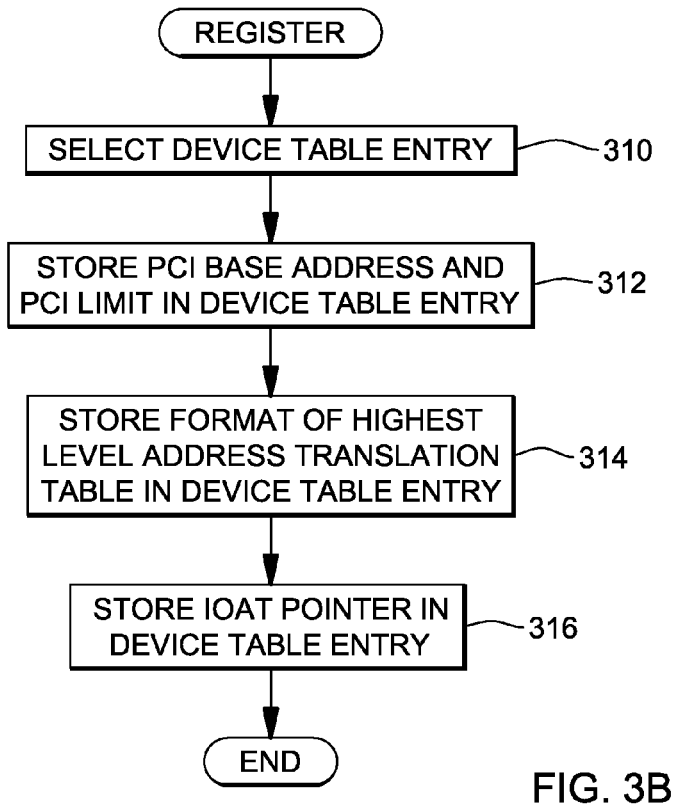
FIG. 3B depicts one embodiment of various details of registering the DMA address space for the adapter, in accordance with an aspect of the present invention.

Thereafter, the DMA address space is registered for the adapter, STEP 304, as described in further detail with reference to FIG. 3B. In this example, it is assumed there is one PCI function per adapter, and therefore, one requestor ID per adapter. This logic is performed by, for instance, a central processing unit coupled to the system memory, responsive to an operating system request.

Initially, in one embodiment, an available device table entry is selected that is to correspond to the requestor ID of the adapter, STEP 310. That is, the requestor ID will be used to locate a device table entry.

Additionally, the PCI base address and the PCI limit are stored in the device table entry, STEP 312. Further, the format of the highest level address translation table is also stored in the device table entry, STEP 314, as well as the input/output address translation (IOAT) pointer used to point to the highest level address translation table, STEP 316. This completes the registration process.

Figure 4:
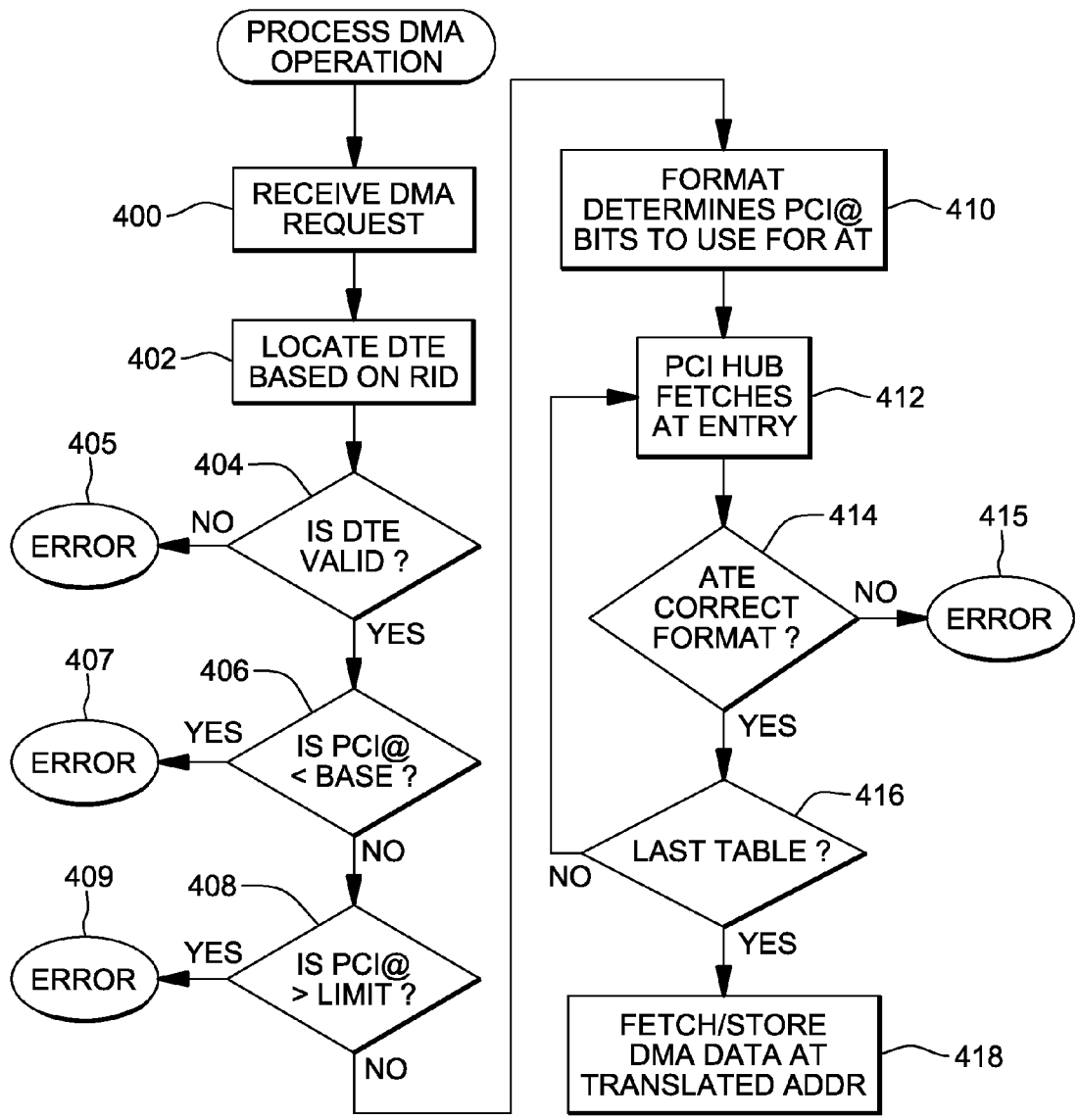
FIG. 4 depicts one embodiment of the logic to process a DMA operation, in accordance with an aspect of the present invention.

Responsive to performing registration, a DMA address space and corresponding address translation tables are ready for use, as well as a device table entry. Details regarding processing a request issued by a requestor, such as an adapter, to access system memory are described with reference to FIG. 4. The processing described below is performed by the I/O hub. In one example, it is the address translation and protection unit of the I/O hub that performs the logic.

In one embodiment, initially, a DMA request is received at the input/output hub, STEP 400. For instance, a PCI function issues a request that is forwarded to the PCI hub via, for instance, a PCI switch. Using the requestor ID in the request, the appropriate device table entry is located, STEP 402. Thereafter, a determination is made as to whether the device table entry is valid, INQUIRY 404. In one example, validity is determined by checking a validity bit in the entry itself. This bit is set, for instance, in response to execution of an enable function request by the operating system. If enabled, the bit is set to, e.g., one (i.e., valid); otherwise, it remains at zero (i.e., invalid). In a further example, the bit may be set when the registration process is complete.

If the device table entry is invalid, an error is presented, STEP 405. Otherwise, a further determination is made as whether the PCI address provided in the request is less than the PCI base address stored in the device table entry, INQUIRY 406. If it is, then the address is outside a valid range and an error is provided, STEP 407. However, if the PCI address is greater than or equal to the base address, then another determination is made as to whether the PCI address is greater than the PCI limit value in the device table entry, INQUIRY 408. If the PCI address is greater than the limit, then once again, an error is presented since the address is outside the valid range, STEP 409. However, if the address is within a valid range, then processing continues.

In one example, the format provided in the device table entry is used to determine the PCI address bits in the address to be used for address translation, STEP 410. For instance, if the format indicates the upper level table is a first-level table with 4 k pages, then bits 29:21 of the address are used to index into the first-level table; bits 20:12 are used to index into the page table; and bits 11:0 are used to index into the page. The bits used depend on how many bits are needed to index into the given size page or table. For instance, for a 4 k page with byte level addressing, 12 bits are used to address 4096 bytes; and for a 4 k page table with 512 entries, 8 bytes each, 9 bits are used to address 512 entries.

Next, the PCI hub fetches the appropriate address translation table entry, STEP 412. For instance, initially, the highest level translation table is located using the IOAT pointer of the device table entry. Then, bits of the address (those after the high order bits used for validity and not translation; e.g., bits 29:21 in the above example) are used to locate the particular entry within that table.

A determination is then made based, for instance, on the format provided in the device table entry, as to whether the located address translation entry has a correct format, INQUIRY 414. For instance, the format in the device table entry is compared with a format indicated in the address translation entry. If equal, then the format in the device table entry is valid. If not, an error is provided, STEP 415; otherwise, processing continues with a determination as to whether this is the last table to be processed, INQUIRY 416. That is, a determination is made as to whether there are other address translation tables needed to obtain the real or absolute address or whether the lowest level table entry has been located. This determination is made based on the provided format size of the tables already processed. If it is not the last table, then processing continues with STEP 412. Otherwise, the I/O hub continues processing to enable a fetch or store of the data at the translated address, STEP 418. In one example, the I/O hub forwards the translated address to the memory controller, which uses the address to fetch or store data at the DMA location designated by the translated address.

The number of levels of translation, and therefore, the number of fetches required to perform translation are reduced. This is accomplished by, for instance, ignoring the high order bits of an address during translation and only using the low order bits to traverse the translation tables, which are based, for instance, on the size of the DMA address space assigned to the adapter. The use of a partial address versus the full address is further shown in the following examples.

Figure 5A:
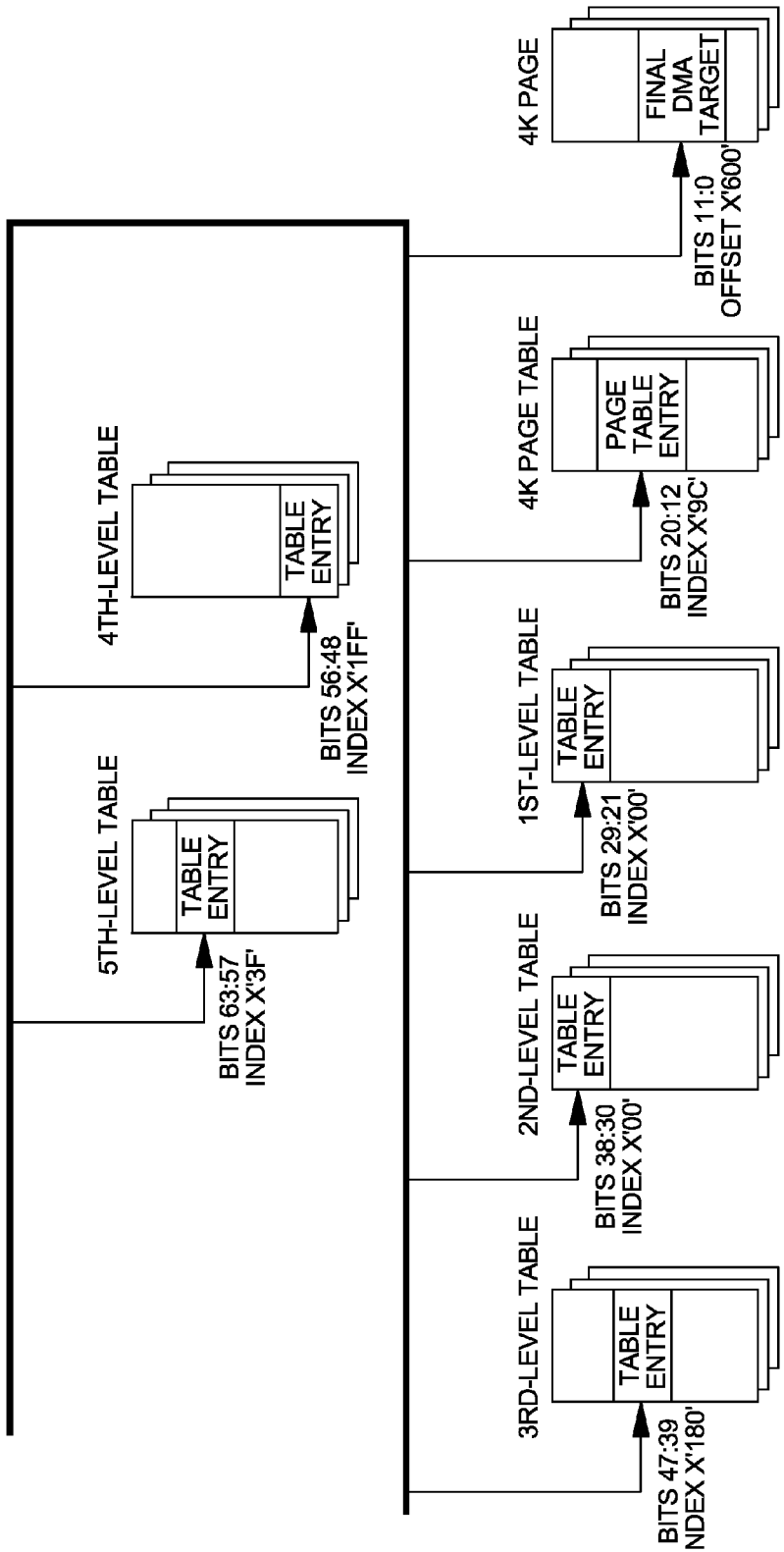
FIG. 5A depicts one example of the levels of translation employed when an entire address is used to index into address translation tables to translate the address and to access the page.

Referring initially to FIG. 5A, an example is depicted in which the entire address is used in address translation/memory access. With this prior technique, six levels of translation tables are needed, including the page table. The beginning of the highest level table (e.g., the 5th-level table in this example) is pointed to by an IOAT pointer, and then bits of the PCI address are used to locate an entry in the table. Each translation table entry points to the start of a lower level translation table or to a page (e.g., an entry in the 5th-level table points to the start of a 4th-level table, etc.)

In this example, the DMA address space (DMAAS) is 6M in size, and each table is 4 k bytes having a maximum of 512 8-byte entries (except the 5th-level table, which only supports 128 entries based on the size of the address). The address is, for instance, 64 bits: FFFF C000 0009 C600. The beginning of the 5th-level table is pointed to by the IOAT pointer and bits 63:57 of the PCI address are used to index into the 5th-level table to locate the beginning of the 4th-level table; bits 56:48 of the PCI address are used to index into the 4th-level table to locate the beginning of the 3rd-level table; bits 47:39 are used to index into the 3rd-level table to locate the beginning of the 2nd-level table; bits 38:30 are used to index into the 2nd-level table to locate the beginning of the 1st-level table; bits 29:21 are used to index into the 1st-level table to locate the beginning of the page table; bits 20:12 are used to index the page table to locate the beginning of the page; and bits 11:0 are used to locate the entry in the 4 k page. Thus, in this example, all of the address bits are used for translation/access.

Figure 5B:
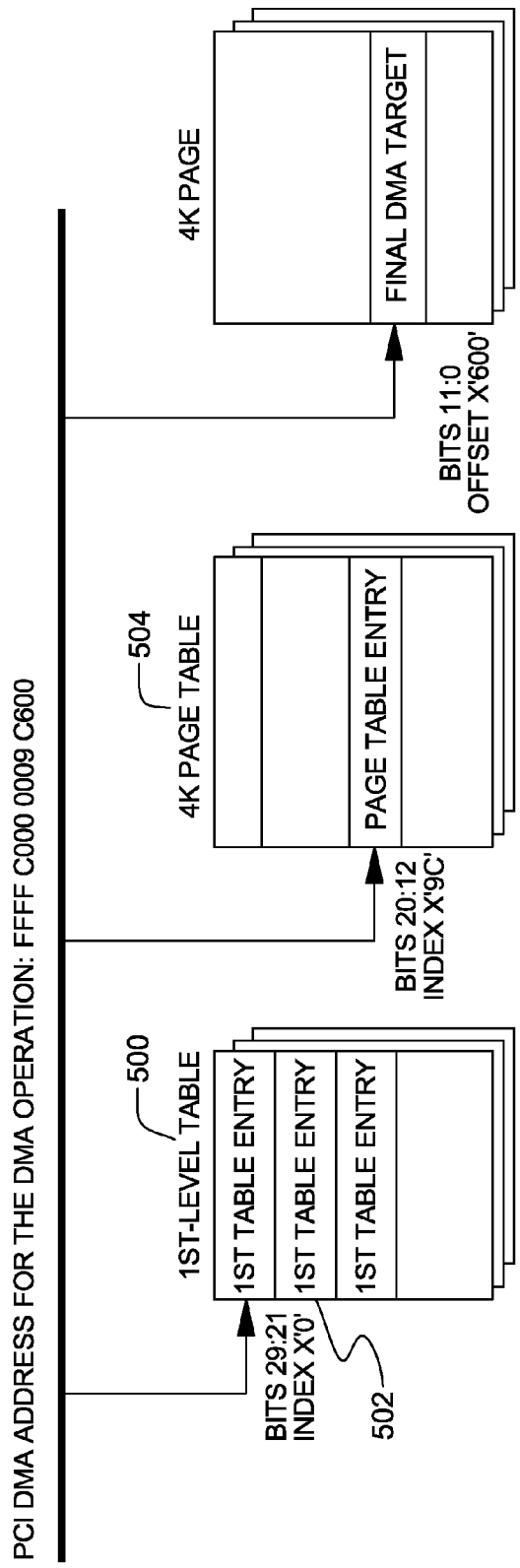
FIG. 5B depicts one example of levels of translation employed when a part of the address is ignored when indexing into the address translation tables, in accordance with an aspect of the present invention.

This is in contrast to the example in FIG. 5B, in which the address space is the same size (e.g., 6M) and the address is the same, but the translation technique ignores some of the address bits during translation. In this example, bits 63:30 of the address are ignored for translation. The IOAT pointer points to the beginning of the 1st-level table and bits 29:21 of the PCI address are used to index into the 1st-level table to locate the beginning of the page table; bits 20:12 are used to index into the appropriate page table to locate the beginning of the page; and bits 11:0 are used to index into the 4 k page.

As shown, 1st-level table 500 includes three entries 502, each providing an address to one of the three page tables 504. The number of page tables needed, and therefore, the number of other level tables, depends, for instance, on the size of the DMA address space, the size of the translation tables, and/or the size of the pages. In this example, the DMA address space is 6M, and each page table is 4 k, having up to 512 entries. Therefore, each page table can map up to 2M of memory (4 k×512 entries). Thus, three page tables are needed for the 6M address space. The 1st-level table is able to hold the three entries, one for each page table, and thus, no further levels of address translation tables are needed, in this example.

The DMA address space assigned to a particular adapter is a defined size of memory and may include or have associated therewith one or more structures, such as, for instance, one or more queues, one or more buffers, other control structures, and/or one or more address translation tables, etc. For instance, an adapter may use an input queue, an output queue, an input buffer for messages and/or an output buffer for messages. The memory required for the one or more queues/ buffers, control structures, etc. is part of the overall memory of the address space assigned to the adapter. Further, one or more address translation tables (located outside the DMA address space) are assigned to the DMA address space. These address translation tables may be used to locate particular locations in memory.

As workloads change for the adapter, it may be beneficial to resize the address space, including one or more of the structures, if needed. Responsive to the resizing, one or more address translation tables may be added/removed. Further, the number of levels of translation may change.

In accordance with an aspect of the present invention, an address space is resized concurrent to being accessed. As examples, the size of an address space can be increased or decreased without disrupting on-going transfers (e.g., read/ write operations). In a resize of the address space, the PCI base address does not change. Memory is added to or removed from the end of the address space. When increasing the size of an address space, no purge of cached address translation information (e.g., in the translation lookaside buffers (TLBs)) is required. However, purging may be performed when reducing the size of the address space. If, in response to resizing the address space, no additional levels of address translation tables are required or fewer levels of address translation tables are not required, the PCI limit is changed and not the IOAT pointer. If, however, additional levels of tables are required, the new tables are initialized and point to the existing frame/tables, as well as the new ones; the IOAT pointer and translation format are updated; and then, the new PCI limit is stored in the DTE. If fewer levels of tables are required, the PCI limit is updated with the smaller value, and then the IOAT pointer and translation format are updated to point to the lower level table. After the cache is purged, the tables may be reclaimed.

One embodiment of the logic to increase an address space, in accordance with an aspect of the present invention, is described with reference to FIG. 6A. This logic is performed by, for instance, a processor (i.e., central processing unit) coupled to system memory.

Figure 6A:
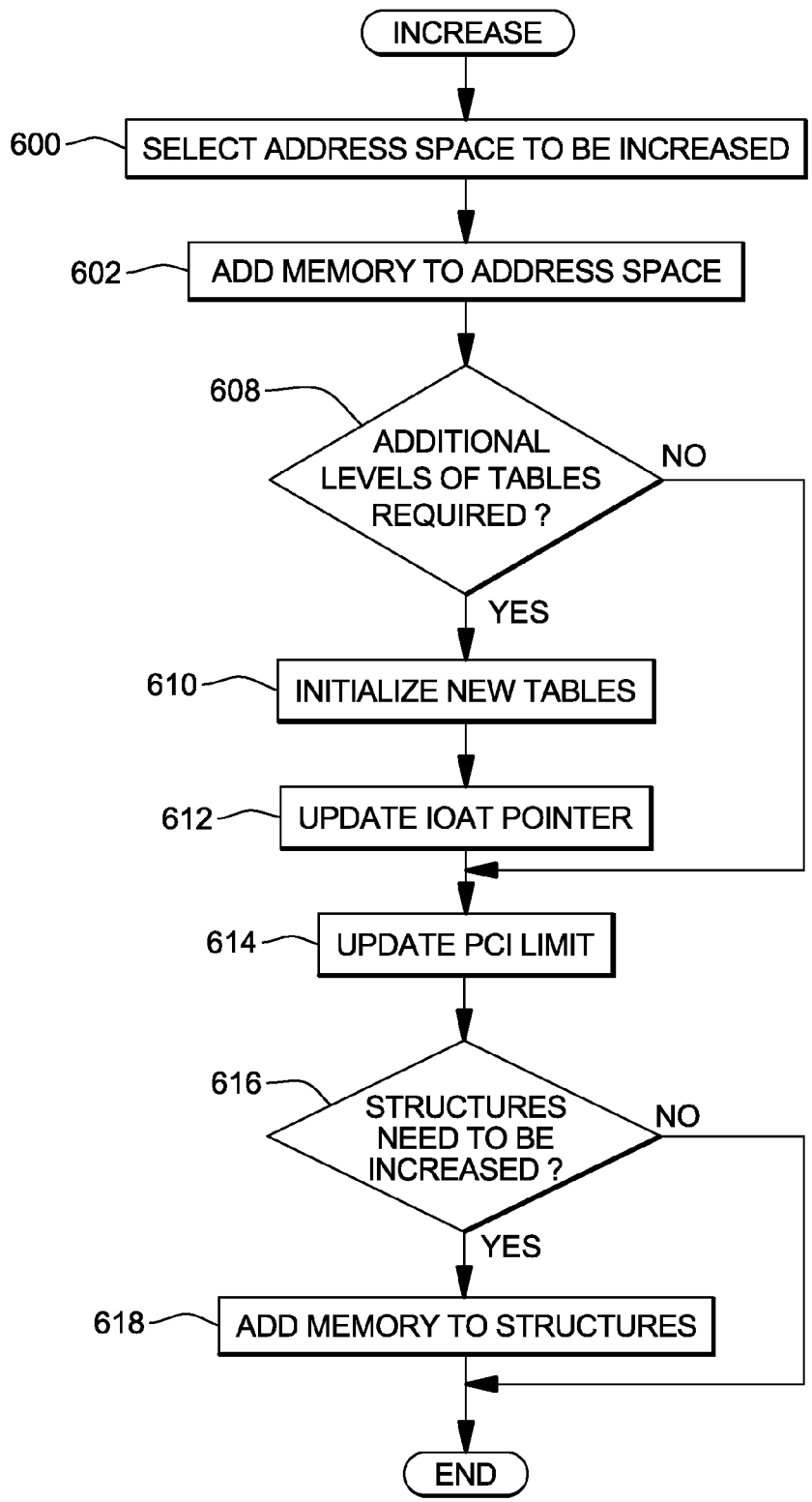
FIG. 6A depicts one example of the logic to increase the size of an address space, in accordance with an aspect of the present invention.

Referring to FIG. 6A, initially, an operating system executing on the processor performing this logic determines that an address space is to receive additional memory, STEP 600. This determination may be based on the fullness of queues and/or buffers, workload, various statistics, etc. Responsive to determining that the size of an address space is to be increased, the operating system adds a selected amount of memory to, for instance, the end of the address space, STEP 602. This amount may be predetermined or dynamically determined based on the workload of the address space or other criteria.

Thereafter, a determination is made as to whether the increase requires additional levels of address translation tables to be used, INQUIRY 608. If additional levels of address translation tables are to be employed, then those new tables are initialized by, for instance, the operating system, STEP 610. Additionally, the IOAT pointer is updated to point to the new highest level address translation table, STEP 612, and then the PCI limit in the device table entry is updated to reflect the increased size, STEP 614. In one example, this is performed by the firmware of the processor, in response to a re-register instruction issued by the operating system.

As used herein, firmware includes, e.g., the microcode, millicode and/or macrocode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware.

Subsequently, a determination is made as to whether particular structures associated with the address space, such as the queues, buffers, other control structures, and/or address translation tables, are to receive additional memory, INQUIRY 616. If so, memory is added to, for instance, the end of the structure to increase the size of the structure, and/or an additional structure, such as an additional translation table, is created, STEP 618. If not, processing is complete.

Returning to INQUIRY 608, if the increase does not require additional levels of address translation tables, then processing continues with updating the PCI limit, STEP 614; determining whether one or more structures are to be increased, INQUIRY 616; and adding memory to one or more structures, if needed, STEP 618. This concludes processing of an increase of the address space while the address space is being accessed (e.g., DMA operations are in progress). Responsive to this processing, the operating system can provide an indication to the adapter that it can make use of the expanded address space by, for instance, updating a control block accessible to the adapter.

Figure 6B:
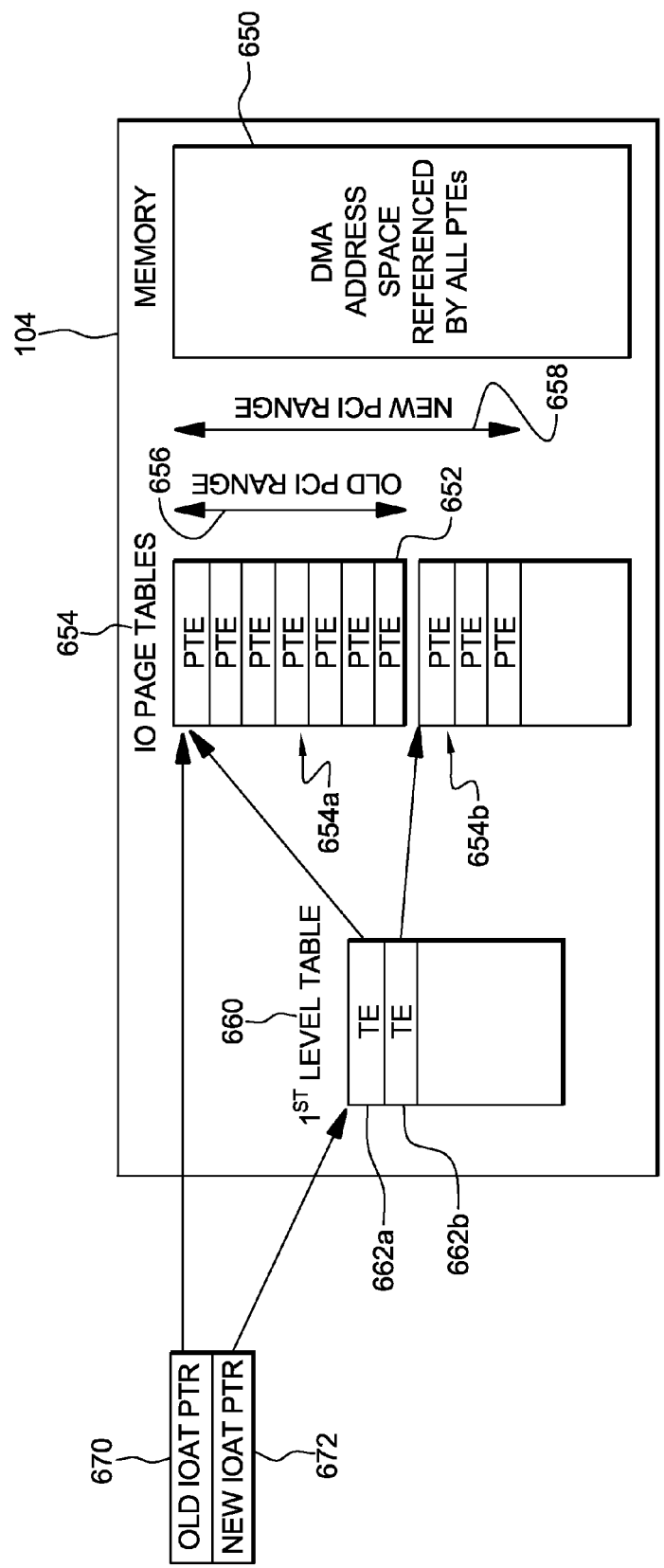
FIG. 6B pictorially depicts an example of increasing the size of an address space, in accordance with an aspect of the present invention.

One example of a pictorial representation of increasing an address space is depicted in FIG. 6B. As shown in FIG. 6B, there is a DMA address space 650 stored in system memory 104. Address space 650 is referenced by page table entries 652 of one or more I/O page tables 654. Before resizing, the PCI range is indicated by 656. The increase, however, adds additional entries to the tables, causing an additional I/O page table to be created, as indicated by 658. Responsive to the additional page table being created, a first level table 660 is created. This first level address translation table has two entries: one entry 662a that includes a pointer to the beginning of a first I/O page table 654a; and a second entry 662b, which points to the beginning of a second page table 654b. Before resizing, an IOAT pointer 670 pointed to the beginning of I/O page table 654a. After resizing, however, a new IOAT pointer 672 points to the beginning of first level table 660. The entries within that table then point to the respective I/O page tables, as previously indicated.

In addition to being able to increase the size of an address space concurrent to DMA operations, an address space may also be reduced in size concurrent to DMA operations. One embodiment of the logic associated with reducing the size of an address space is described with reference to FIG. 7A. In one example, it is a processor (i.e., central processing unit) that performs this logic.

Figure 7A:
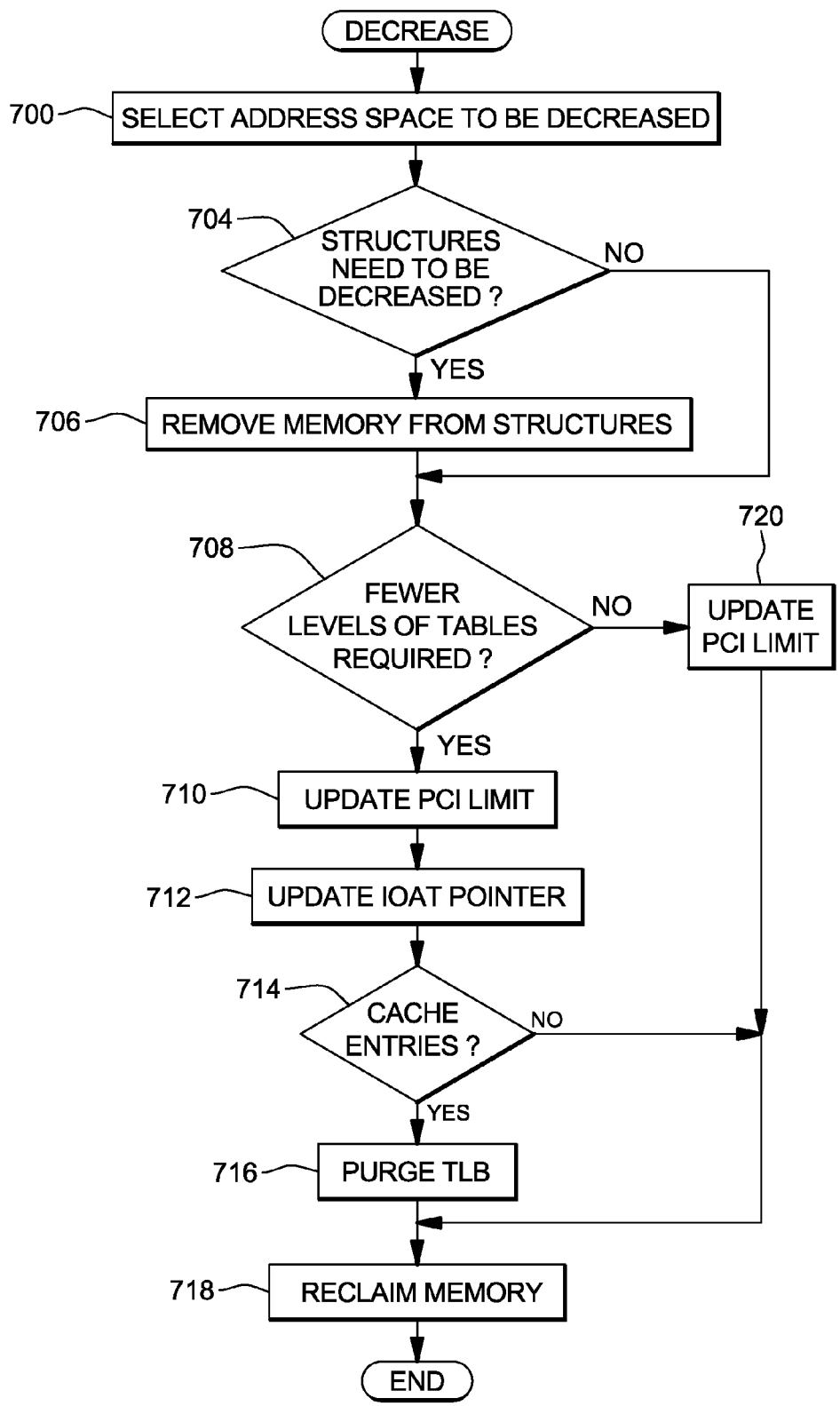
FIG. 7A depicts one example of the logic to decrease the size of an address space, in accordance with an aspect of the present invention.

Referring to FIG. 7A, initially, an operating system executing on the processor performing this logic determines that an address space is to be decreased in size, STEP 700. This determination may be based on workload and/or various statistics obtained by the operating system. Responsive to determining that the size of the address space is to be decreased, a determination is made as to whether a particular structure associated with the address space, such as one or more queues, one or more buffers, other control structures, and/or address translation tables, are to be reduced in size, INQUIRY 704. If so, memory is removed from, for instance, the end of the structure to decrease the size of the structure, STEP 706. The adapter is then notified that the structures are reduced in size by, for instance, updating a control block accessible to the adapter.

Thereafter, or if particular structures are not to be reduced, a determination is made as to whether the address space will be decreased such that fewer levels of address translation tables are required, INQUIRY 708. If fewer levels of tables are required, then the PCI limit is updated to reflect the reduced size, STEP 710. Further, the IOAT pointer is updated to the new highest level address translation table, STEP 712.

Additionally, a determination is made as to whether there are any cache entries relating to this address space (e.g., cached address translation information or other data), INQUIRY 714. If so, the entire cache (e.g., translation lookaside buffer(s)) or selected entries (e.g., those entries associated with the DTE) are purged, STEP 716. Thereafter, or if there are no cache entries, the memory no longer needed is reclaimed, STEP 718. For instance, memory no longer used by tables is reclaimed, as well as memory removed from the address space.

Returning to INQUIRY 708, if fewer levels of tables are not required, then the PCI limit is updated, STEP 720, and any memory no longer needed is reclaimed, STEP 718. This concludes processing.

Figure 7B:
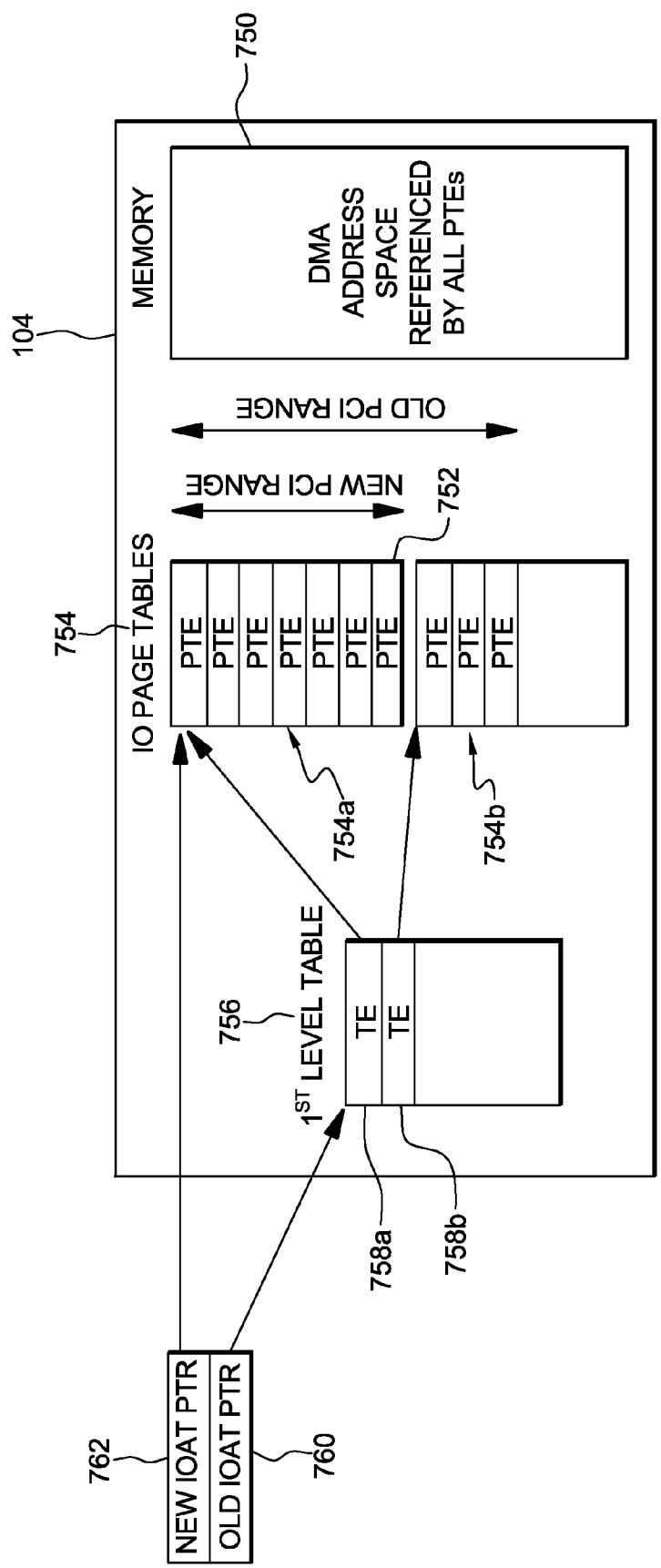
FIG. 7B pictorially depicts an example of decreasing the size of an address space, in accordance with an aspect of the present invention.

One example of a pictorial representation of decreasing an address space is depicted in FIG. 7B. Again, within system memory 104 there is an address space 750, which is referenced by page table entries 752 of one or more I/O page tables 754. Initially, the PCI range of address space includes two I/O page tables: 754a and 754b. Therefore, a first level table 756 is used that includes two entries: a first entry 758a, which points to the beginning of first page table 754a, and a second page table entry 758b that points to the beginning of the second page table 754b. An IOAT pointer 760 points to the beginning of the first level table 756.

In response to a decrease in size, the second page table is not needed, in this example. Therefore, the first level table is also not needed. Thus, a new IOAT pointer 762 points to the beginning of I/O page table 754a.

When reducing the size of an address space, old entries may be in a cache, such as a translation lookaside buffer. These entries are purged after the DTE has been updated. After the purge has completed, the operating system may reclaim the unused pages and table entries.

In addition to the capabilities for increasing or decreasing the size of a DMA address space described above, an embodiment may implement a translation format where no address translation tables are used. In this no-table format, the IOAT pointer directly designates the location of a single contiguous block of storage comprising the DMA address space. The techniques described above may be used to increase the size of a DMA address space that is initially defined using a no-table IOAT format, resulting in a DMA address space that is defined using one or more levels of address translation tables. Similarly, the size of a DMA address space that is initially defined using one or more levels of address translation tables may be reduced to a no-table format.

In one particular implementation, to perform the registration of a DMA address space to the adapter, an instruction referred to as a Modify PCI Function Controls (MPFC) instruction, is used. For example, the operating system determines which address translation format it wishes to use, builds the address translation tables for that format, and then issues the MPFC instruction with that format included as an operand of the instruction. In one example, the format and other operands of the instruction are included in a function information block (described below), which is an operand of the instruction. The function information block is then used to update the DTE and, in one embodiment, optionally, a function table entry (FTE) that includes operational parameters of the adapter.

Figure 8A:
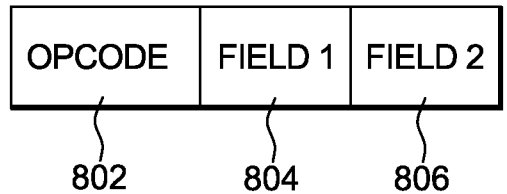
FIG. 8A depicts one embodiment of a Modify PCI Function Controls instruction used in accordance with an aspect of the present invention.

One embodiment of the details related to this instruction, and particularly the registration process, are described with reference to FIGS. 8A-12. Referring to FIG. 8A, a Modify PCI Function Controls instruction 800 includes, for instance, an op code 802 indicating the Modify PCI Function Controls instruction; a first field 804 specifying a location at which various information is included regarding the adapter function for which the operational parameters are being established; and a second field 806 specifying a location from which a PCI function information block (FIB) is fetched. The contents of the locations designated by Fields 1 and 2 are further described below.

Figure 8B:
FIG. 8B depicts one embodiment of a field used by the Modify PCI Function Controls instruction of FIG. 8A, in accordance with an aspect of the present invention.

In one embodiment, Field 1 designates a general register that includes various information. As shown in FIG. 8B, the contents of the register include, for instance, a function handle 810 that identifies the handle of the adapter function on behalf of which the modify instruction is being performed; an address space 812 designating an address space in system memory associated with the adapter function designated by the function handle; an operation control 814 which specifies the operation to be performed for the adapter function; and status 816 which provides status regarding the instruction when the instruction completes with a predefined code.

In one embodiment, the function handle includes, for instance, an enable indicator indicating whether the handle is enabled, a function number that identifies an adapter function (this is a static identifier and may be used to index into a function table); and an instance number specifying the particular instance of this function handle. There is one function handle for each adapter function, and it is used to locate a function table entry (FTE) within the function table. Each function table entry includes operational parameters and/or other information associated with its adapter function. As one example, a function table entry includes:

Instance Number: This field indicates a particular instance of the adapter function handle associated with the function table entry;

Device Table Entry (DTE) Index 1 . . . n: There may be one or more device table indices, and each index is an index into a device table to locate a device table entry (DTE). There are one or more device table entries per adapter function, and each entry includes information associated with its adapter function, including information used to process requests of the adapter function (e.g., DMA requests, MSI requests) and information relating to requests associated with the adapter function (e.g., PCI instructions). Each device table entry is associated with one address space within system memory assigned to the adapter function. An adapter function may have one or more address spaces within system memory assigned to the adapter function.

Busy Indicator: This field indicates whether the adapter function is busy;

Permanent Error State Indicator: This field indicates whether the adapter function is in a permanent error state;

Recovery Initiated Indicator: This field indicates whether recovery has been initiated for the adapter function;

Permission Indicator: This field indicates whether the operating system trying to control the adapter function has authority to do so;

Enable Indicator: This field indicates whether the adapter function is enabled (e.g., 1=enabled, 0=disabled);

Requestor Identifier (RID): This is an identifier of the adapter function, and includes, for instance, a bus number, a device number and a function number.

In one example, this field is used for accesses of a configuration space of the adapter function. (Memory of an adapter may be defined as address spaces, including, for instance, a configuration space, an I/O space, and/or one or more memory spaces.) In one example, the configuration space may be accessed by specifying the configuration space in an instruction issued by the operating system (or other configuration) to the adapter function. Specified in the instruction is an offset into the configuration space and a function handle used to locate the appropriate function table entry that includes the RID. The firmware receives the instruction and determines it is for a configuration space. Therefore, it uses the RID to generate a request to the I/O hub, and the I/O hub creates a request to access the adapter. The location of the adapter function is based on the RID, and the offset specifies an offset into the configuration space of the adapter function.

Base Address Register (BAR) (1 to n): This field includes a plurality of unsigned integers, designated as $BAR_0$-$BAR_n$, which are associated with the originally specified adapter function, and whose values are also stored in the base address registers associated with the adapter function. Each BAR specifies the starting address of a memory space or I/O space within the adapter function, and also indicates the type of address space, that is whether it is a 64 or 32 bit memory space, or a 32 bit I/O space, as examples;

In one example, it is used for accesses to memory space and/or I/O space of the adapter function. For instance, an offset provided in an instruction to access the adapter function is added to the value in the base address register associated with the address space designated in the instruction to obtain the address to be used to access the adapter function. The address space identifier provided in the instruction identifies the address space within the adapter function to be accessed and the corresponding BAR to be used;

Size 1 . . . n: This field includes a plurality of unsigned integers, designated as $SIZE_0$-$SIZE_n$. The value of a Size field, when non-zero, represents the size of each address space with each entry corresponding to a previously described BAR.

Further details regarding BAR and Size are described below.
1. When a BAR is not implemented for an adapter function, the BAR field and its corresponding size field are both stored as zeros.
2. When a BAR field represents either an I/O address space or a 32-bit memory address space, the corresponding size field is non-zero and represents the size of the address space.
3. When a BAR field represents a 64-bit memory address space,
    a. The $BAR_n$ field represents the least significant address bits.
    b. The next consecutive $BAR_{n+1}$ field represents the most significant address bits.
    c. The corresponding $SIZE_{n+1}$ field is non-zero and represents the size of the address space.
    d. The corresponding $SIZE_{n+1}$ field is not meaningful and is stored as zero.

Internal Routing Information: This information is used to perform particular routing to the adapter. It includes, for instance, node, processor chip, and hub addressing information, as examples.

Status Indication: This provides an indication of, for instance, whether load/store operations are blocked or the adapter is in the error state, as well as other indications.

In one example, the busy indicator, permanent error state indicator, and recovery initiated indicator are set based on monitoring performed by the firmware. Further, the permission indicator is set, for instance, based on policy; and the BAR information is based on configuration information discovered during a bus walk by the processor (e.g., firmware of the processor). Other fields may be set based on configuration, initialization, and/or events. In other embodiments, the function table entry may include more, less or different information. The information included may depend on the operations supported by or enabled for the adapter function.

Figure 8C:
FIG. 8C depicts one embodiment of another field used by the Modify PCI Function Controls instruction of FIG. 8A, in accordance with an aspect of the present invention.

Referring to FIG. 8C, in one example, Field 2 designates a logical address 820 of a PCI function information block (FIB), which includes information regarding an associated adapter function. The function information block is used to update a device table entry and/or function table entry (or other location) associated with the adapter function. The information is stored in the FIB during initialization and/or configuration of the adapter, and/or responsive to particular events.

Further details regarding a function information block (FIB) are described with reference to FIG. 8D. In one embodiment, a function information block 850 includes the following fields:

Format 851: This field specifies the format of the FIB.
Interception Control 852: This field is used to indicate whether guest execution of specific instructions by a pageable mode guest results in instruction interception;
Error Indication 854: This field includes the error state indication for direct memory access and adapter interruptions. When the bit is set (e.g., 1), one or more errors have been detected while performing direct memory access or adapter interruption for the adapter function;
Load/Store Blocked 856: This field indicates whether load/store operations are blocked;
PCI Function Valid 858: This field includes an enablement control for the adapter function. When the bit is set (e.g., 1), the adapter function is considered to be enabled for I/O operations;
Address Space Registered 860: This field includes a direct memory access enablement control for an adapter function. When the field is set (e.g., 1) direct memory access is enabled;
Page Size 861: This field indicates the size of the page or other unit of memory to be accessed by a DMA memory access;
PCI Base Address (PBA) 862: This field is a base address for an address space in system memory assigned to the adapter function. It represents the lowest virtual address that an adapter function is allowed to use for direct memory access to the specified DMA address space;
PCI Address Limit (PAL) 864: This field represents the highest virtual address that an adapter function is allowed to access within the specified DMA address space;
Input/Output Address Translation Pointer (IOAT) 866: The input/output address translation pointer designates the first of any translation tables used by a PCI virtual address translation, or it may directly designate the absolute address of a frame of storage that is the result of translation;
Interruption Subclass (ISC) 868: This field includes the interruption subclass used to present adapter interruptions for the adapter function;
Number of Interruptions (NOI) 870: This field designates the number of distinct interruption codes accepted for an adapter function. This field also defines the size, in bits, of the adapter interruption bit vector designated by an adapter interruption bit vector address and adapter interruption bit vector offset fields;

Adapter Interruption Bit Vector Address (AIBV) 872: This field specifies an address of the adapter interruption bit vector for the adapter function. This vector is used in interrupt processing;

Adapter Interruption Bit Vector Offset 874: This field specifies the offset of the first adapter interruption bit vector bit for the adapter function;

Adapter Interruption Summary Bit Address (AISB) 876: This field provides an address designating the adapter interruption summary bit, which is optionally used in interrupt processing;

Adapter Interruption Summary Bit Offset 878: This field provides the offset into the adapter interruption summary bit vector;

Function Measurement Block (FMB) Address 880: This field provides an address of a function measurement block used to collect measurements regarding the adapter function;

Function Measurement Block Key 882: This field includes an access key to access the function measurement block;

Summary Bit Notification Control 884: This field indicates whether there is a summary bit vector being used;

Instruction Authorization Token 886: This field is used to determine whether a pageable storage mode guest is authorized to execute PCI instructions without host intervention.

In one example, in the z/Architecture®, a pageable guest is interpretively executed via the Start Interpretive Execution (SIE) instruction, at level 2 of interpretation. For instance, the logical partition (LPAR) hypervisor executes the SIE instruction to begin the logical partition in physical, fixed memory. If z/VM® is the operating system in that logical partition, it issues the SIE instruction to execute its guests (virtual) machines in its V=V (virtual) storage. Therefore, the LPAR hypervisor uses level-1 SIE, and the z/VM® hypervisor uses level-2 SIE; and Address Translation Format 887: This field indicates a selected format for address translation of the highest level translation table to be used in translation (e.g., segment table, region 3rd, etc.).

The function information block designated in the Modify PCI Function Controls instruction is used to modify a selected device table entry, a function table entry and/or other firmware controls associated with the adapter function designated in the instruction. By modifying the device table entry, function table entry and/or other firmware controls, certain services are provided for the adapter. These services include, for instance, adapter interruptions; address translations; reset error state; reset load/store blocked; set function measurement parameters; and set interception control.

One embodiment of the logic associated with the Modify PCI Function Controls instruction is described with reference to FIG. 9. In one example, the instruction is issued by an operating system (or other configuration) and executed by the processor (e.g., firmware) executing the operating system. In the examples herein, the instruction and adapter functions are PCI based. However, in other examples, a different adapter architecture and corresponding instructions may be used.

In one example, the operating system provides the following operands to the instruction (e.g., in one or more registers designated by the instruction): the PCI function handle; the DMA address space identifier; an operation control; and an address of the function information block.

Figure 9:
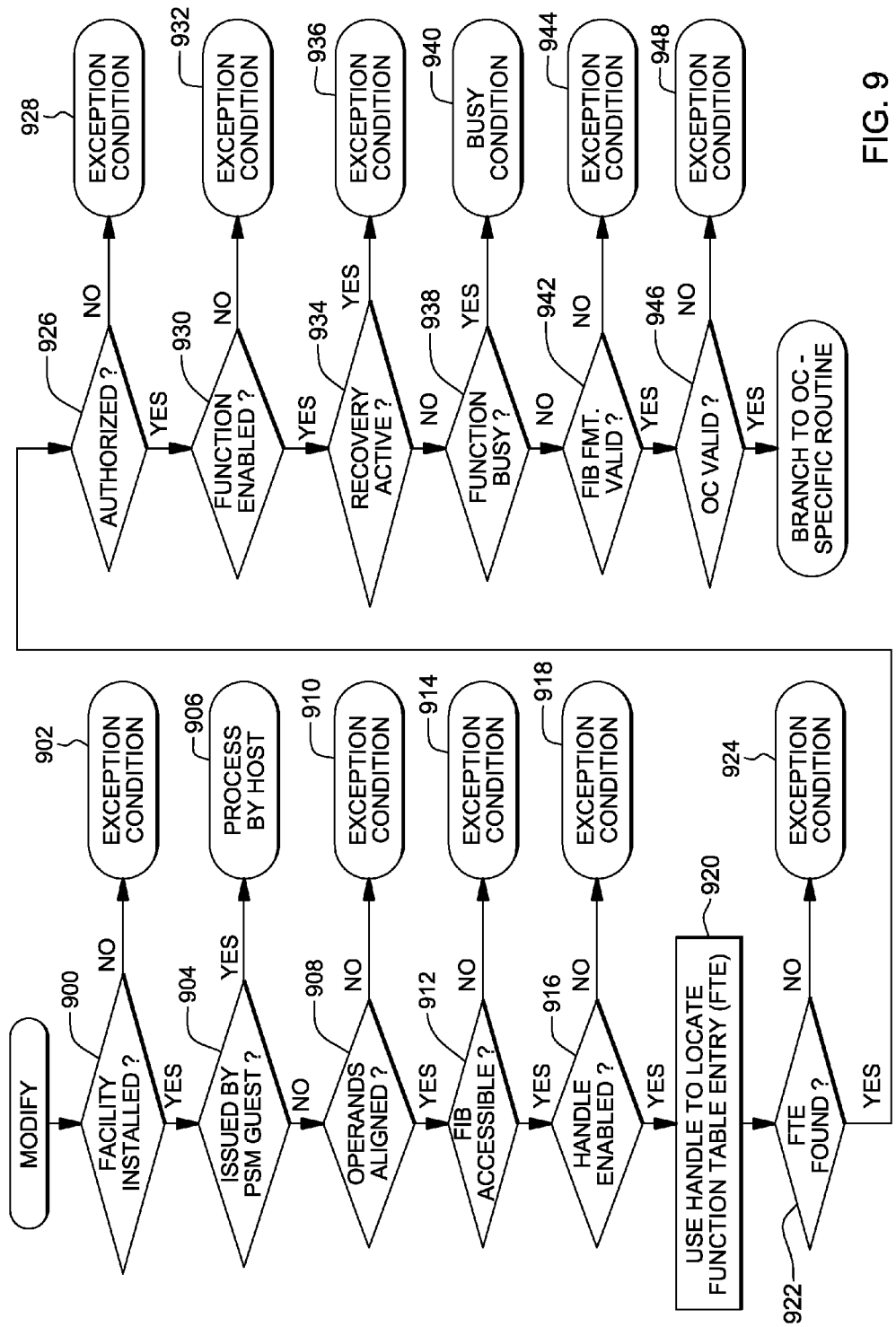
FIG. 9 depicts one embodiment of an overview of the logic of the Modify PCI Function Controls instruction, in accordance with an aspect of the present invention.

Referring to FIG. 9, initially, a determination is made as to whether the facility allowing for a Modify PCI Function Controls instruction is installed, INQUIRY 900. This determination is made by, for instance, checking an indicator stored in, for instance, a control block. If the facility is not installed, an exception condition is provided, STEP 902. Otherwise, a determination is made as to whether the instruction was issued by a pageable storage mode guest (or other guest), INQUIRY 904. If yes, the host operating system will emulate the operation for that guest, STEP 906.

Otherwise, a determination is made as to whether one or more of the operands are aligned, INQUIRY 908. For instance, a determination is made as to whether the address of the function information block is on a double word boundary. In one example, this is optional. If the operands are not aligned, then an exception condition is provided, STEP 910. Otherwise, a determination is made as to whether the function information block is accessible, INQUIRY 912. If not, then an exception condition is provided, STEP 914. Otherwise, a determination is made as to whether the handle provided in the operands of the Modify PCI Function Controls instruction is enabled, INQUIRY 916. In one example, this determination is made by checking an enable indicator in the handle. If the handle is not enabled, then an exception condition is provided, STEP 918.

If the handle is enabled, then the handle is used to locate a function table entry, STEP 920. That is, at least a portion of the handle is used as an index into the function table to locate the function table entry corresponding to the adapter function for which operational parameters are to be established.

A determination is made as to whether the function table entry was found, INQUIRY 922. If not, then an exception condition is provided, STEP 924. Otherwise, if the configuration issuing the instruction is a guest, INQUIRY 926, then an exception condition (e.g., interception to the host) is provided, STEP 928. This inquiry may be ignored if the configuration is not a guest or other authorizations may be checked, if designated.

A determination is then made as to whether the function is enabled, INQUIRY 930. In one example, this determination is made by checking an enable indicator in the function table entry. If it is not enabled, then an exception condition is provided, STEP 932.

If the function is enabled, then a determination is made as to whether recovery is active, INQUIRY 934. If recovery is active as determined by a recovery indicator in the function table entry, then an exception condition is provided, STEP 936. However, if recovery is not active, then a further determination is made as to whether the function is busy, INQUIRY 938. This determination is made by checking the busy indicator in the function table entry. If the function is busy, then a busy condition is provided, STEP 940. With the busy condition, the instruction can be retried, instead of dropped.

If the function is not busy, then a further determination is made as to whether the function information block format is valid, INQUIRY 942. For instance, the format field of the FIB is checked to determine if this format is supported by the system. If it is invalid, then an exception condition is provided, STEP 944. If the function information block format is valid, then a further determination is made as to whether the operation control specified in the operands of the instruction is valid, INQUIRY 946. That is, is the operation control one of the specified operation controls for this instruction. If it is invalid, then an exception condition is provided, STEP 948. However, if the operation control is valid, then processing continues with the specific operation control being specified.

One operation control that may be specified is a register I/O address translation parameters operation used in controlling address translations for an adapter. With this operation, the PCI function parameters relevant to I/O address translation are set in the DTE, FTE and/or other location from the appropriate parameters of the FIB, which is an operand to the instruction. These parameters include, for instance, the PCI base address; the PCI address limit (a.k.a., PCI limit or limit); the address translation format; the page size; and the I/O address translation pointer, which are operands to this operation. There are also implied operands, including a starting DMA address (SDMA) and an ending DMA address (EDMA), which are stored in a location accessible to the processor executing the instruction.

Figure 10:
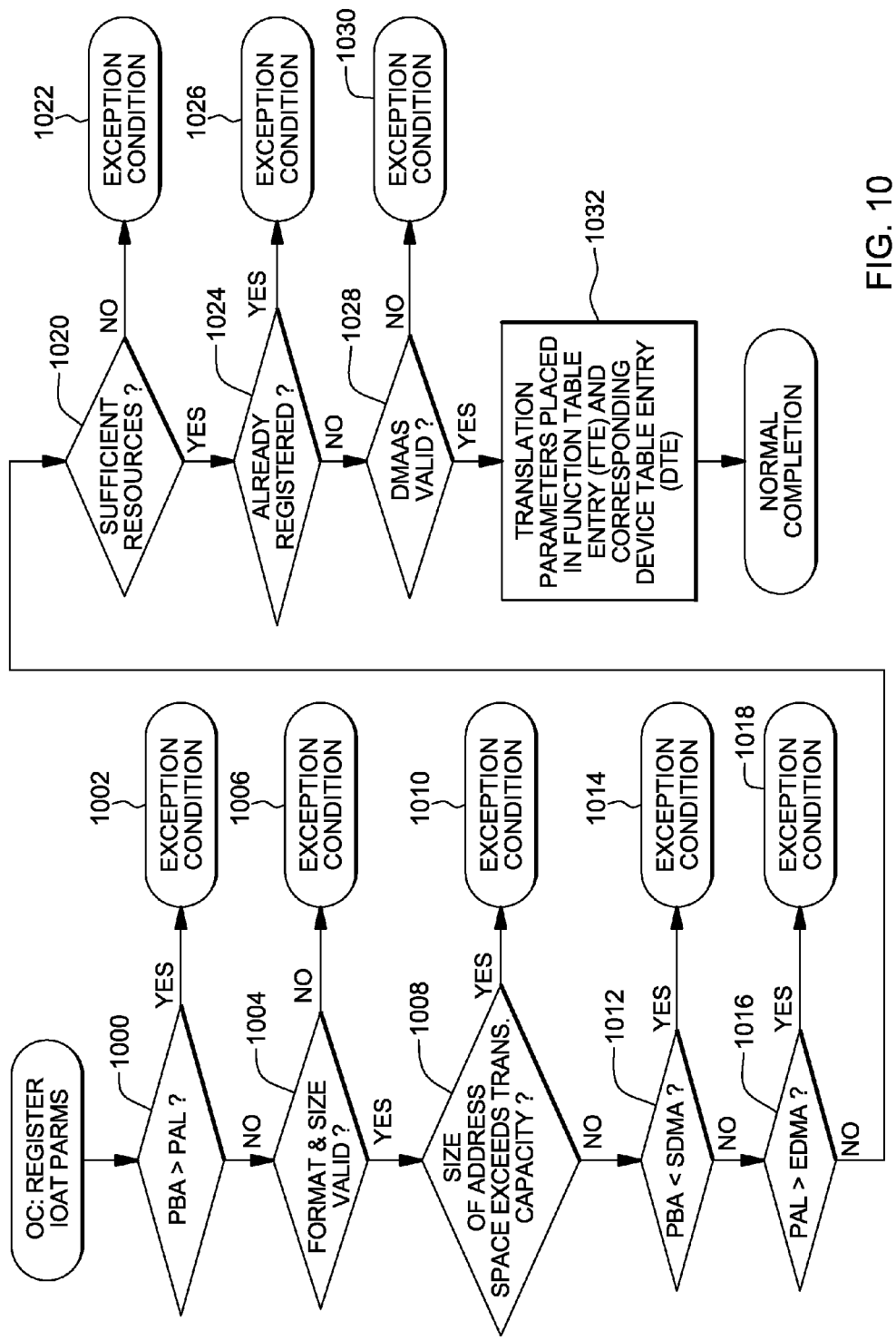
FIG. 10 depicts one embodiment of the logic associated with a register I/O address translation parameters operation that may be specified by the Modify PCI Function Controls instruction, in accordance with an aspect of the present invention.

One embodiment of the logic to establish the operational parameters for I/O address translation is described with reference to FIG. 10. Initially, a determination is made as to whether the PCI base address in the FIB is greater than the PCI limit in the FIB, INQUIRY 1000. If the comparison of the base address and the limit indicate that the base address is greater than the PCI limit, then an exception condition is recognized, STEP 1002. However, if the base address is less than or equal to the limit, then a further determination is made as to whether the address translation format and the page size are valid, INQUIRY 1004. If they are invalid, then an exception condition is provided, STEP 1006. However, if they are valid, then a further determination is made as to whether the size of the address space (based on the base address and limit) exceeds the translation capacity, INQUIRY 1008. In one example, the size of the address space is compared to the maximum address translation capacity possible based on the format of the upper level table. For example, if the upper level table is a DAT compatible segment table, the maximum translation capacity is 2 Gbytes.

If the size of the address space exceeds the translation capacity, then an exception condition is provided, STEP 1010. Otherwise, a further determination is made as to whether the base address is less than the starting DMA address, INQUIRY 1012. If so, then an exception condition is provided, STEP 1014. Otherwise, another determination is made as to whether the address limit is greater than the ending DMA address, INQUIRY 1016. If so, then an exception condition is provided, STEP 1018. In one example, the starting DMA address and ending DMA address are based on a system-wide policy.

Thereafter, a determination is made as to whether sufficient resources, if any are needed, are available to perform an I/O address translation, INQUIRY 1020. If not, then an exception condition is provided, STEP 1022. Otherwise, a further determination is made as to whether the I/O address translation parameters have already been registered in the FTE and DTE, INQUIRY 1024. This is determined by checking the values of the parameters in the FTE/DTE. For instance, if the values in the FTE/DTE are zero or another defined value, then registration has not been performed. To locate the FTE, the handle provided in the instruction is used, and to locate the DTE, a device index in the FTE is used.

If the adapter function has already been registered for address translation, then an exception condition is provided, STEP 1026. If not, then a determination is made as to whether the DMA address space that is specified is valid (i.e., is it an address space for which a DTE has been enabled), INQUIRY 1028. If not, then an exception condition is provided, STEP 1030. If all the checks are successful, then the translation parameters are placed in the device table entry and optionally, in the corresponding function table entry (or other designated location), STEP 1032. For instance, the PCI function parameters relevant to I/O address translation are copied from the function information block and placed in the DTE/FTE. These parameters include, for instance, the PCI base address, the PCI address limit, the translation format, the page size, and the I/O address translation pointer. This operation enables DMA accesses to the specified DMA address space. It enables I/O address translation for the adapter function.

Another operation control that may be specified by the Modify PCI Function Controls instruction is an unregister I/O address translation parameters operation, an example of which is described with reference to FIG. 11. With this operation, the function parameters relevant to I/O address translation are reset to zeros. This operation disables DMA accesses to the specified DMA address space and causes a purge of I/O translation lookaside buffer entries for that DMA address space. It disables address translation.

Figure 11:
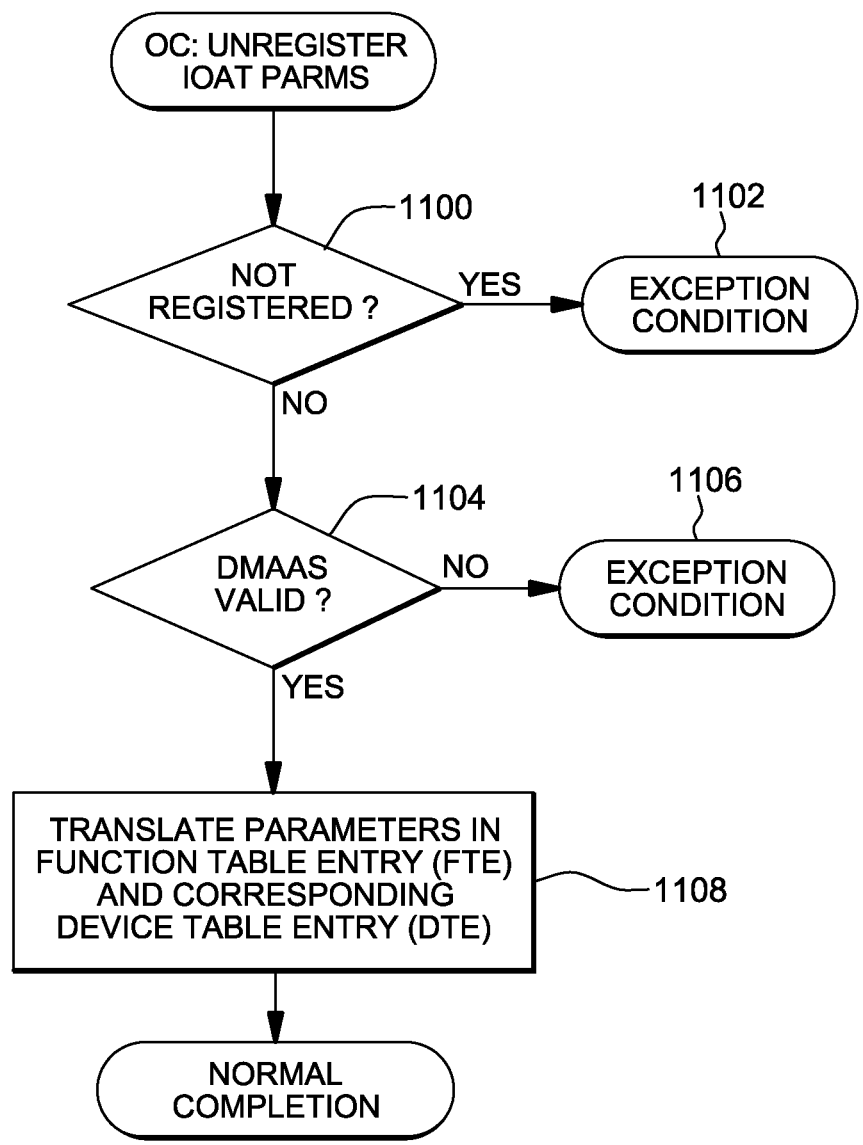
FIG. 11 depicts one embodiment of the logic associated with an unregister I/O address translation parameters operation that may be specified by the Modify PCI Function Controls instruction, in accordance with an aspect of the present invention.

Referring to FIG. 11, in one embodiment, a determination is made as to whether the I/O address translation parameters are not registered, INQUIRY 1100. In one example, this determination is made by checking the values of the appropriate parameters in the FTE or DTE. If those fields are zero or some specified value, they are not registered. Therefore, an exception condition is provided, STEP 1102. If they are registered, then a determination is made as to whether the DMA address space is valid, INQUIRY 1104. If it is invalid, then an exception condition is provided, STEP 1106. If the DMA address space is valid, then the translation parameters in the device table entry and optionally, in the corresponding function table entry are cleared, STEP 1108.

Another operation control is a reregister I/O address translation parameters operation used in resizing of DMA address spaces. With this operation, the PCI function parameters relevant to I/O address translation are replaced with the appropriate parameters of the FIB. These parameters include, for instance, the PCI address limit; I/O address translation pointer; address translation format; and page size, which are provided as operands from the FIB. Implied operands are also the currently registered PCI base address from the function table entry or device table entry, and the ending DMA address.

Figure 12:
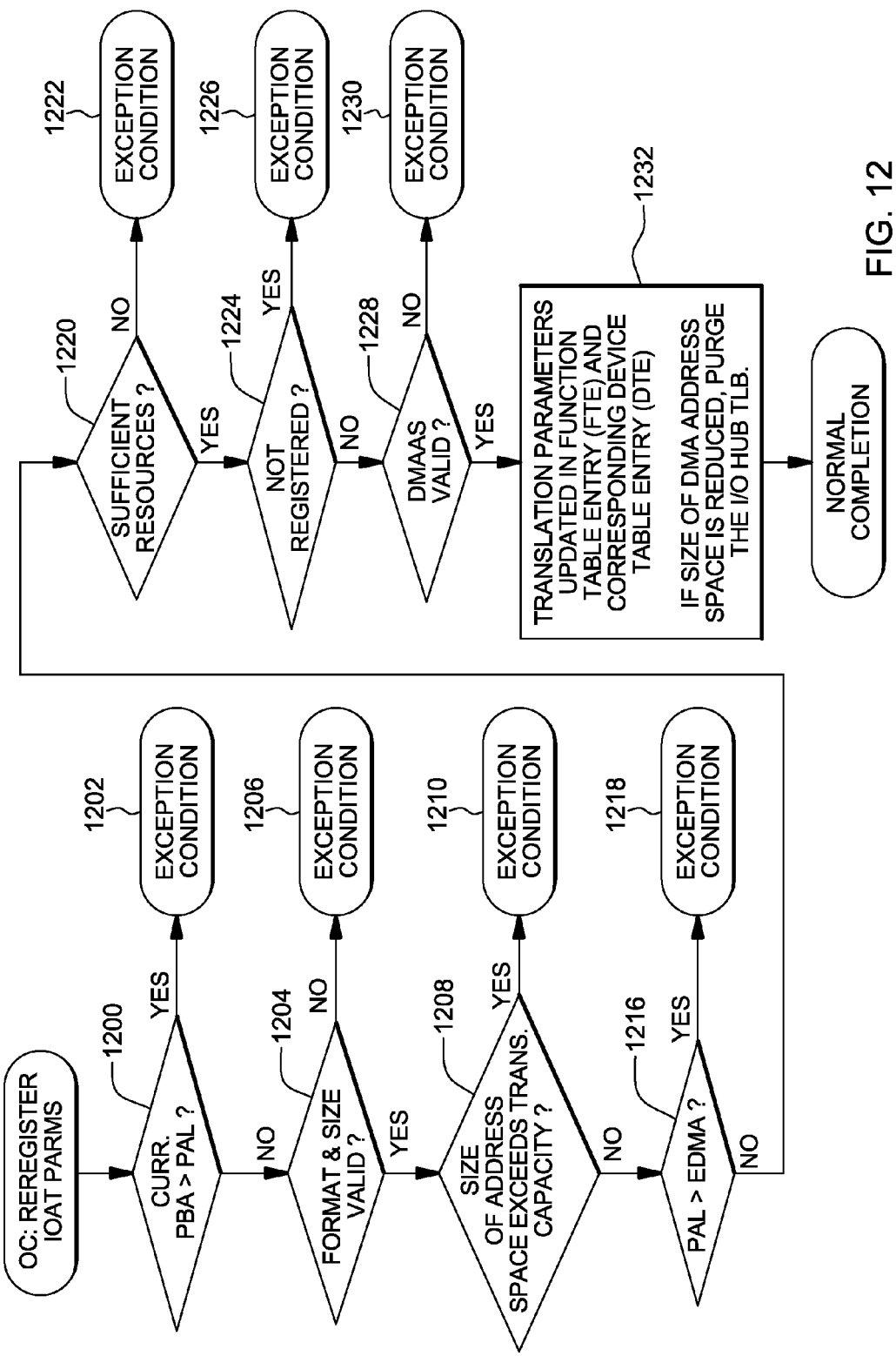
FIG. 12 depicts one embodiment of the logic associated with a reregister I/O address translation parameters operation that may be specified by the Modify PCI Function Controls instruction, in accordance with an aspect of the present invention.

One embodiment of the logic associated with this operation is described with reference to FIG. 12. Initially, a determination is made as to whether the current base address from the function table entry is greater than the PCI address limit specified in the function information block, INQUIRY 1200. If it is, then an exception condition is provided, STEP 1202. If not, then a determination is made as to whether the format and size are valid, INQUIRY 1204. If not, then an exception condition is provided, STEP 1206. If the format of the address translation tables and page size are valid, then a further determination is made as to whether the size of the address space exceeds the translation capacity, INQUIRY 1208. Should the address space size exceed translation capacity, then an exception condition is provided, STEP 1210. If not, then a determination is made as to whether the address limit is greater than the ending DMA address, INQUIRY 1216. If so, then an exception condition is provided, STEP 1218. If not, then a determination is made as to whether there are sufficient resources, if any are needed, to perform this operation, INQUIRY 1220. If there are insufficient resources, then an exception condition is provided, STEP 1222.

If sufficient resources are available, then a determination is made as to whether the I/O address translation is registered for the adapter function, INQUIRY 1224. If not, then an exception condition is provided, STEP 1226. Otherwise, a determination is made as to whether the address space is valid, STEP 1228. If the address space is invalid, an exception condition is provided, STEP 1230. If the checks are successful, the translation parameters are updated in the function table entry (or other designated location) and/or in the corresponding device table entry, STEP 1232. That is, the PCI function parameters relevant to I/O address translation are replaced with the operands from the function information block. These parameters include the PCI address limit, format, page size and I/O address translation pointer fields. The DMA address space and PCI base address fields remain unchanged. A request to change these fields would be ignored or an exception condition would be provided responsive to checking for these conditions. Further, in one embodiment, if the size of the DMA address space is reduced, the translation lookaside buffer in the I/O hub is purged. I/O translation remains enabled.

In one aspect of this operation, controls are included that dictate a particular ordering of updates related to reregistering the address translation parameters. For instance, if the number of levels of translation is increased (i.e., a higher level translation table is to be used), then the input/output address translation pointer is to be changed prior to the PCI address limit and checks are included to ensure this. Further, if the number of levels decreases, then checks are provided to ensure the limit is updated prior to the address translation pointer. Then, a purge of any related translation lookaside buffer is performed.

Described in detail above is a capability for resizing address spaces concurrent to the address spaces being accessed for either read or write operations. The resizing includes increasing or decreasing the size of an address space, which may include increasing or decreasing the size of one or more queues, one or more buffers, address translation tables, and/or other control structures, while the address space is being accessed by read or write operations and without having to shut down operations on the address space. Further, there is a synchronization of cached copies of address translations in the I/O hub. This provides flexibility in the allocation of memory accessible by the adapter without impacting current operations.

In the embodiments described herein, the adapters are PCI adapters. PCI, as used herein, refers to any adapters implemented according to a PCI-based specification as defined by the Peripheral Component Interconnect Special Interest Group (PCI-SIG), including but not limited to, PCI or PCIe. In one particular example, the Peripheral Component Interconnect Express (PCIe) is a component level interconnect standard that defines a bi-directional communication protocol for transactions between I/O adapters and host systems. PCIe communications are encapsulated in packets according to the PCIe standard for transmission on a PCIe bus. Transactions originating at I/O adapters and ending at host systems are referred to as upbound transactions. Transactions originating at host systems and terminating at I/O adapters are referred to as downbound transactions. The PCIe topology is based on point-to-point unidirectional links that are paired (e.g., one upbound link, one downbound link) to form the PCIe bus. The PCIe standard is maintained and published by the PCI-SIG.

Other applications filed on the same day include: U.S. Ser. No. 12/821,170, filed Jun. 23, 2010, entitled "Translation Of Input/Output Addresses To Memory Addresses," Craddock et al.; U.S. Ser. No. 12/821,171, filed Jun. 23, 2010, entitled "Runtime Determination Of Translation Formats For Adapter Functions," Craddock et al.; U.S. Ser. No. 12/821,174, filed Jun. 23, 2010, entitled "Multiple Address Spaces Per Adapter," Craddock et al.; U.S. Ser. No. 12/821,175, filed Jun. 23, 2010, entitled "Converting A Message Signaled Interruption Into An I/O Adapter Event Notification," Craddock et al.; U.S. Ser. No. 12/821,177, filed Jun. 23, 2010, entitled "Converting A Message Signaled Interruption Into An I/O Adapter Event Notification To A Guest Operating System," Brice et al.; U.S. Ser. No. 12/821,178, filed Jun. 23, 2010, entitled "Identification Of Types Of Sources Of Adapter Interruptions," Craddock et al.; U.S. Ser. No. 12/821,179, filed Jun. 23, 2010, entitled "Controlling A Rate At Which Adapter Interruption Requests Are Processed," Belmar et al.; U.S. Ser. No. 12/821,181, filed Jun. 23, 2010, entitled "Controlling The Selectively Setting Of Operational Parameters For An Adapter," Craddock et al.; U.S. Ser. No. 12/821,182, filed Jun. 23, 2010, entitled "Load Instruction for Communicating with Adapters," Craddock et al.; U.S. Ser. No. 12/821,184, filed Jun. 23, 2010, entitled "Controlling Access By A Configuration To An Adapter Function," Craddock et al.; U.S. Ser. No. 12/821,185, filed Jun. 23, 2010, entitled "Discovery By Operating System Of Information Relating To Adapter Functions Accessible To The Operating System," Coneski et al.; U.S. Ser. No. 12/821,187, filed Jun. 23, 2010, entitled "Enable/Disable Adapters Of A Computing Environment," Coneski et al.; U.S. Ser. No. 12/821,190, filed Jun. 23, 2010 entitled "Guest Access To Address Spaces Of Adapter," Craddock et al.; U.S. Ser. No. 12/821,191, filed Jun. 23, 2010, entitled "Managing Processing Associated With Hardware Events," Coneski et al.; U.S. Ser. No. 12/821,192, filed Jun. 23, 2010, entitled "Operating System Notification Of Actions To Be Taken Responsive To Adapter Events," Craddock et al.; U.S. Ser. No. 12/821,193, filed Jun. 23, 2010, entitled "Measurement Facility For Adapter Functions," Brice et al.; U.S. Ser. No. 12/821,194, filed Jun. 23, 2010,entitled "Store/Store Block Instructions for Communicating with Adapters," Craddock et al.; U.S. Ser. No. 12/821,224, filed Jun. 21, 2010, entitled "Associating Input/Output Device Requests With Memory Associated With A Logical Partition," Craddock et al.; U.S. Ser. No. 12/821,247, filed Jun. 23, 2010,entitled "Scalable I/O Adapter Function Level Error Detection, Isolation, And Reporting," Craddock et al.; U.S. Ser. No. 12/821,256, filed Jun. 23, 2010,entitled "Switch Failover Control In A Multiprocessor Computer System," Bayer et al.; U.S. Ser. No. 12/821,242, filed Jun. 23, 2010,entitled "A System And Method For Downbound I/O Expansion Request And Response Processing In A PCIe Architecture," Gregg et al.; U.S. Ser. No. 12/821,243, filed Jun. 23, 2010.entitled "Upbound Input/Output Expansion Request And Response Processing In A PCIe Architecture," Gregg et al.; U.S. Ser. No. 12/821,245, filed Jun. 23, 2010,entitled "A System And Method For Routing I/O Expansion Requests And Responses In A PCIe Architecture," Lais et al.; U.S. Ser. No. 12/821,239, filed Jun. 23, 2010,entitled "Input/Output (I/O) Expansion Response Processing In A Peripheral Component Interconnect Express (PCIe) Environment," Gregg et al.; U.S. Ser. No. 12/821,271, filed Jun. 23, 2010.entitled "Memory Error Isolation And Recovery In A Multiprocessor Computer System," Check et al.; and U.S. Ser. No. 12/821,248, filed Jun. 23, 2010,entitled "Connected Input/Output Hub Management," Bayer et al. each of which is hereby incorporated herein by reference in its entirety.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 13:
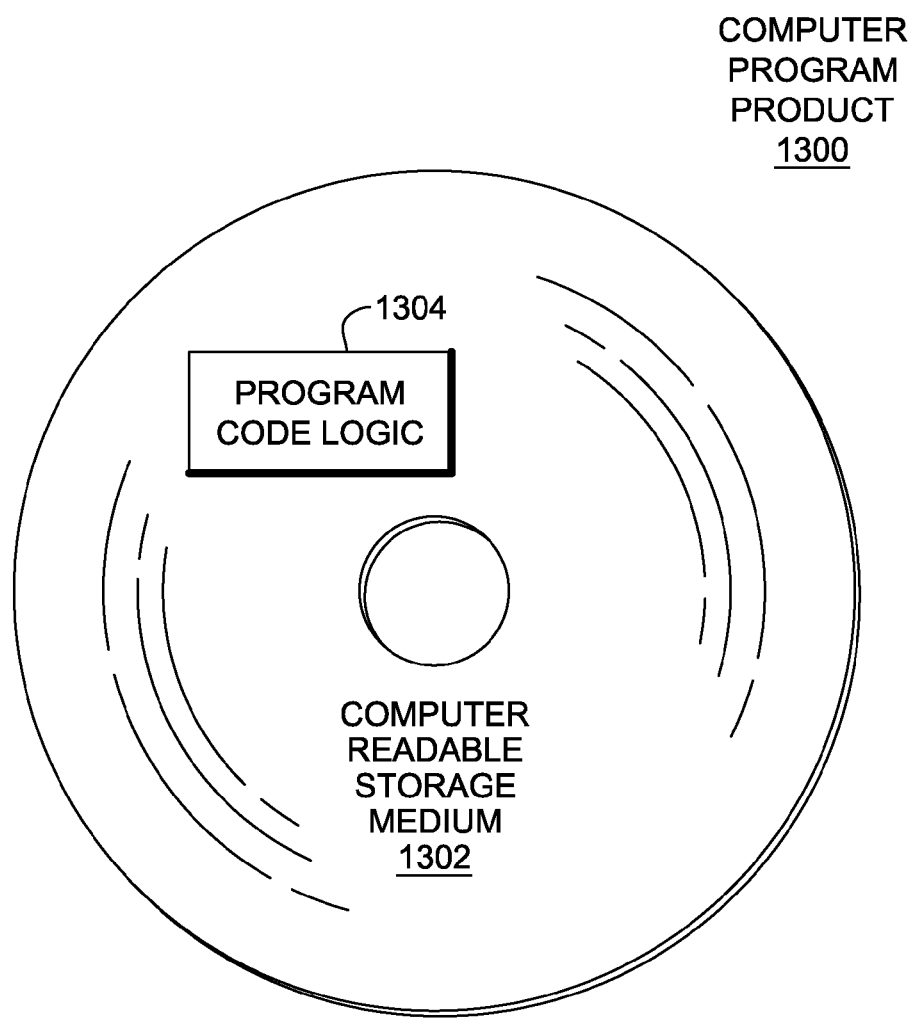
FIG. 13 depicts one embodiment of a computer program product incorporating one or more aspects of the present invention.

Referring now to FIG. 13, in one example, a computer program product 1300 includes, for instance, one or more computer readable storage media 1302 to store computer readable program code means or logic 1304 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. As examples, servers other than System z® servers, such as Power Systems servers or other servers offered by International Business Machines Corporation, or servers of other companies can include, use and/or benefit from one or more aspects of the present invention. Further, although in the example herein, the adapters and PCI hub are considered a part of the server, in other embodiments, they do not have to necessarily be considered a part of the server, but can simply be considered as being coupled to system memory and/or other components of a computing environment. The computing environment need not be a server. Further, although translation tables are described, any data structure can be used and the term table is to include all such data structures. Yet further, although the adapters are PCI based, one or more aspects of the present invention are usable with other adapters or other I/O components. Adapter and PCI adapter are just examples. Moreover, other size address spaces and address tables may be used without departing from the spirit of the present invention. Yet further, other reasons may exist for resizing an address space, and the logic to resize may include more, less or different steps than described herein. Even further, the DTE may include more, less or different information. Many other variations are possible.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 14:
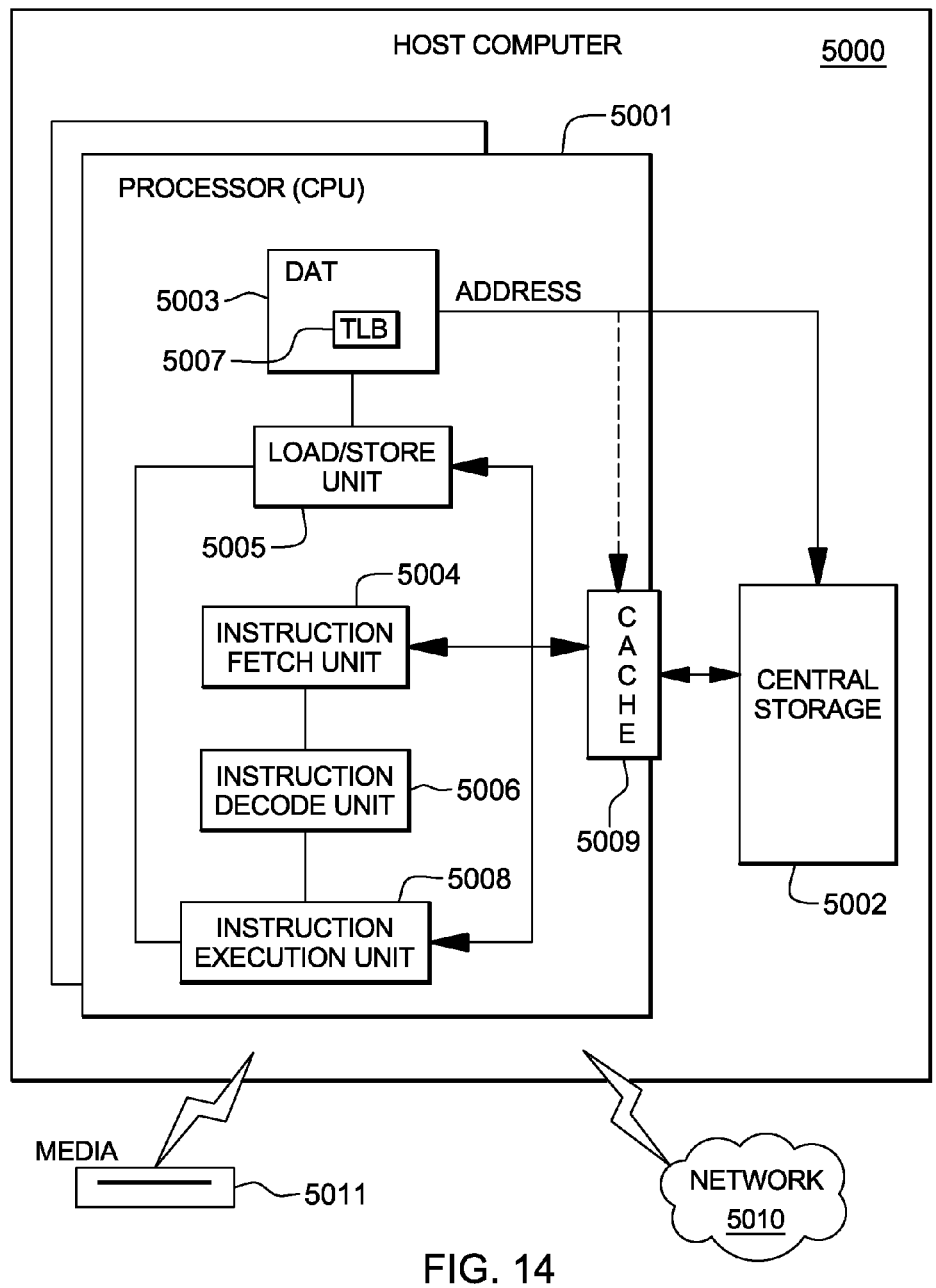
FIG. 14 depicts one embodiment of a host computer system to incorporate and use one or more aspects of the present invention.

Referring to FIG. 14, representative components of a Host Computer system 5000 to implement one or more aspects of the present invention are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture®, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with the present invention). Referring to FIG. 14, software program code which embodies the present invention is typically accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 15:
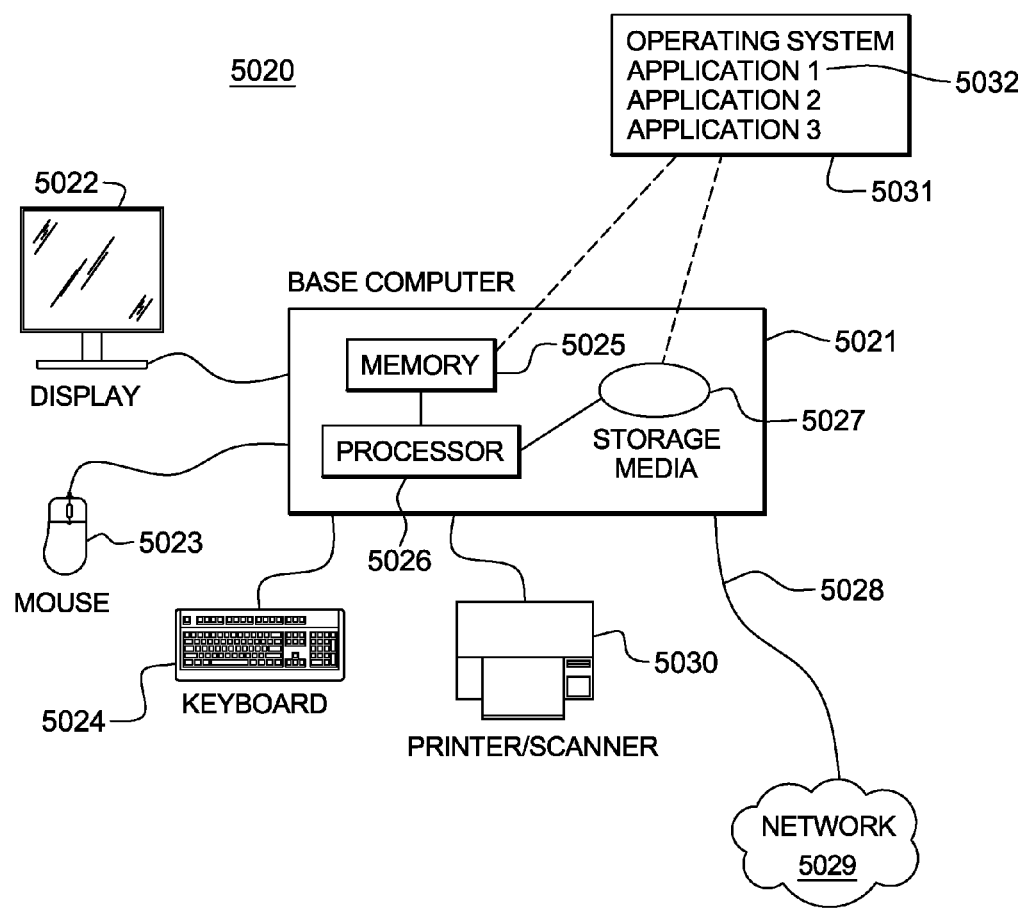
FIG. 15 depicts a further example of a computer system to incorporate and use one or more aspects of the present invention.

FIG. 15 illustrates a representative workstation or server hardware system in which the present invention may be practiced. The system 5020 of FIG. 15 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 16:
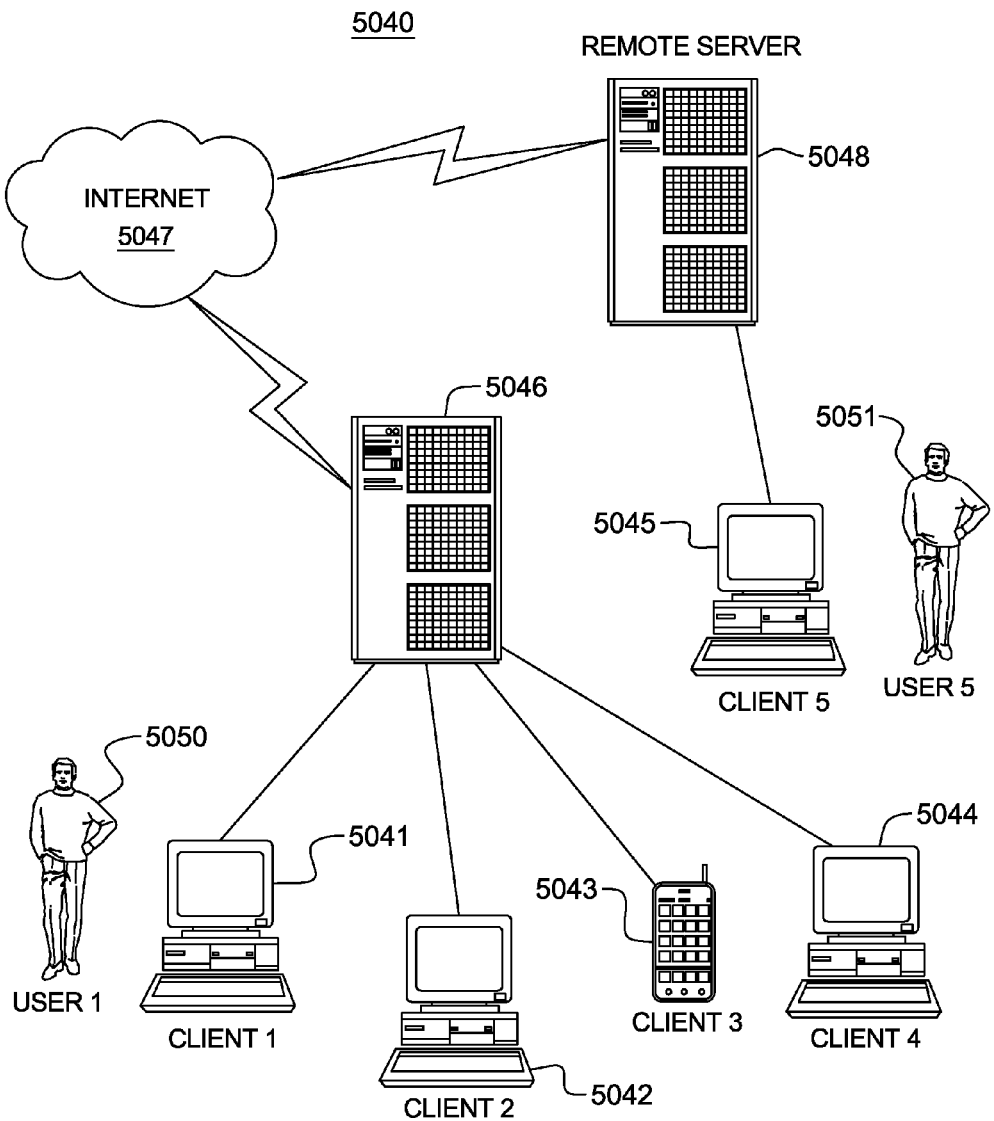
FIG. 16 depicts another example of a computer system comprising a computer network to incorporate and use one or more aspects of the present invention.

FIG. 16 illustrates a data processing network 5040 in which the present invention may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 16, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z® server available from International Business Machines Corporation.

Referring concurrently to FIG. 15 and FIG. 16, software programming code which may embody the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 17:
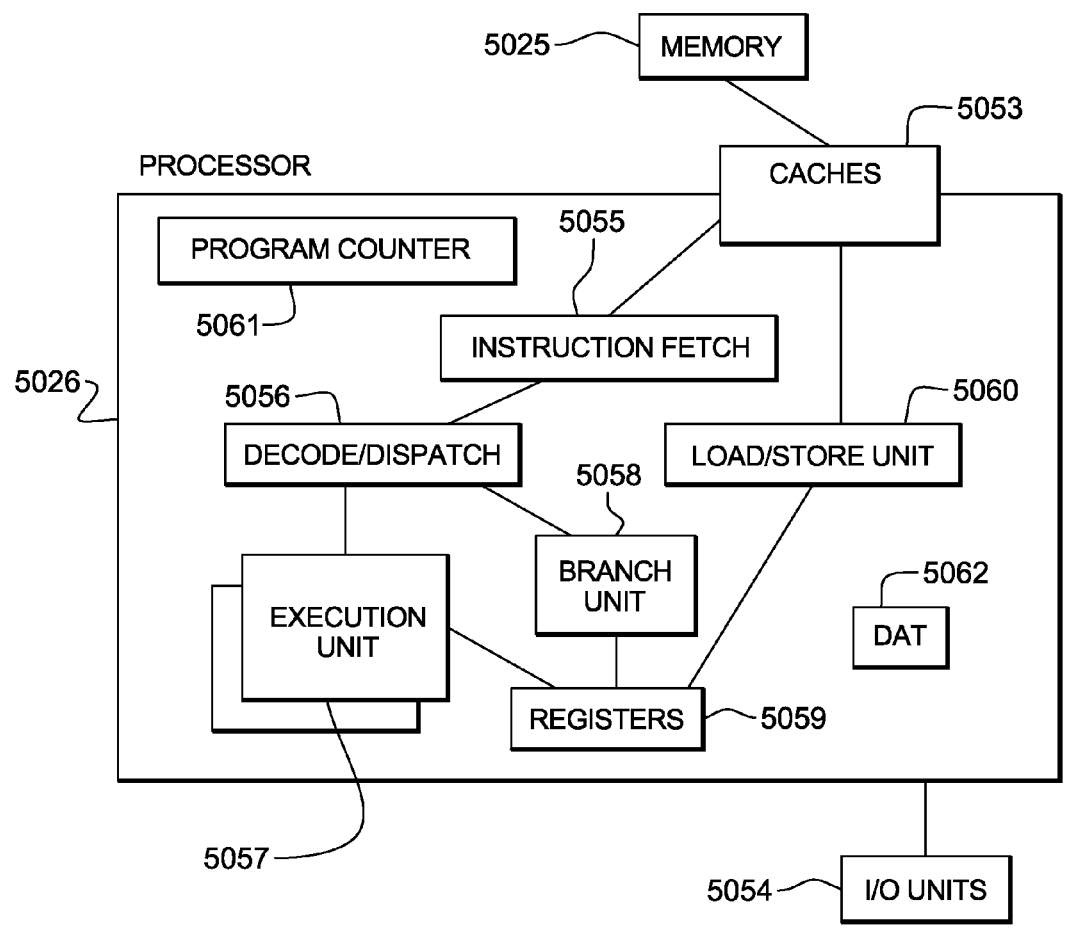
FIG. 17 depicts one embodiment of various elements of a computer system to incorporate and use one or more aspects of the present invention.

Referring to FIG. 17, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 18A:
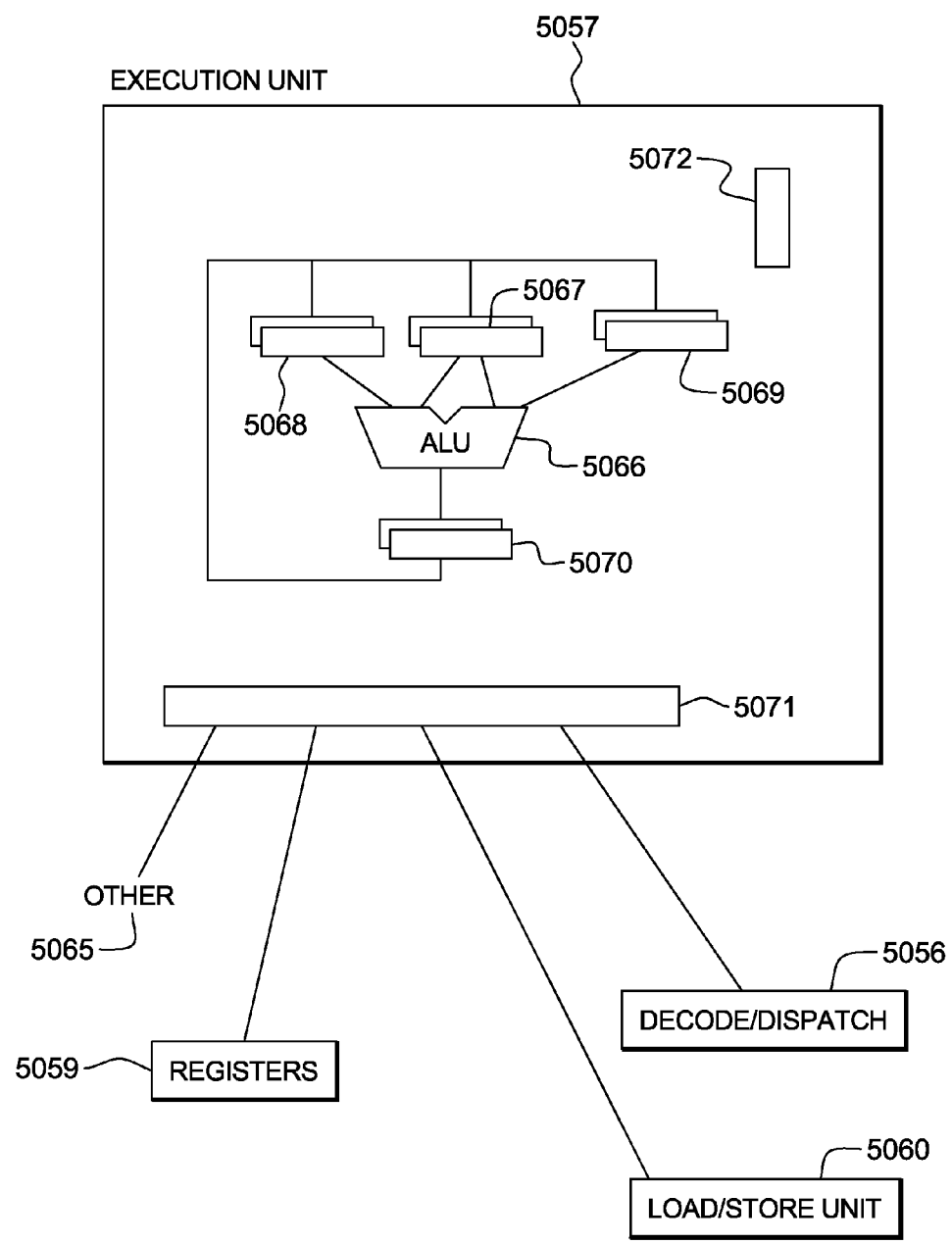
FIG. 18A depicts one embodiment of the execution unit of the computer system of FIG. 17 to incorporate and use one or more aspects of the present invention.

A processor 5026 typically has one or more units 5057, 5058, 5060 for executing the function of the instruction. Referring to FIG. 18A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 18B:
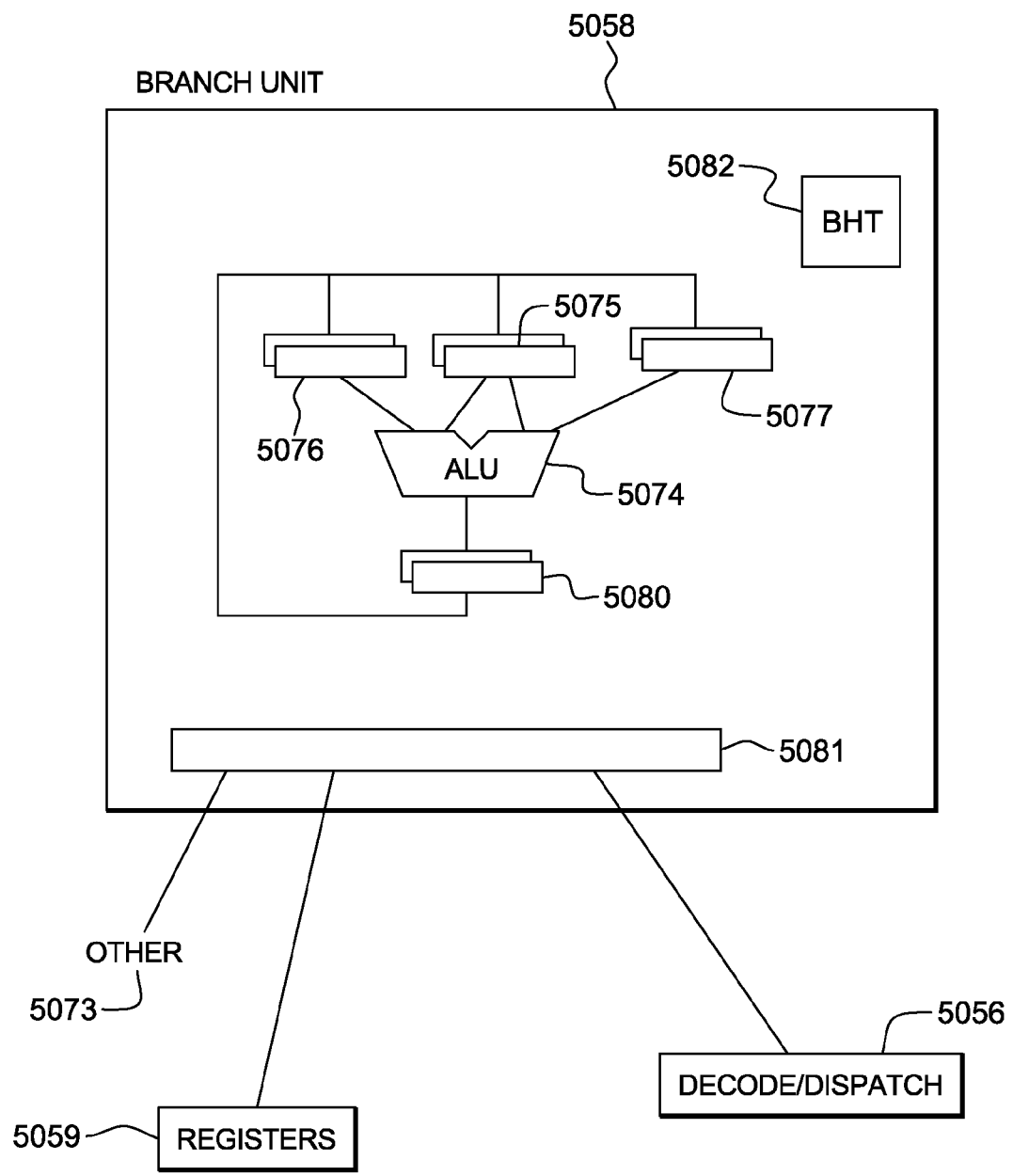
FIG. 18B depicts one embodiment of the branch unit of the computer system of FIG. 17 to incorporate and use one or more aspects of the present invention.

Referring to FIG. 18B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 18C:
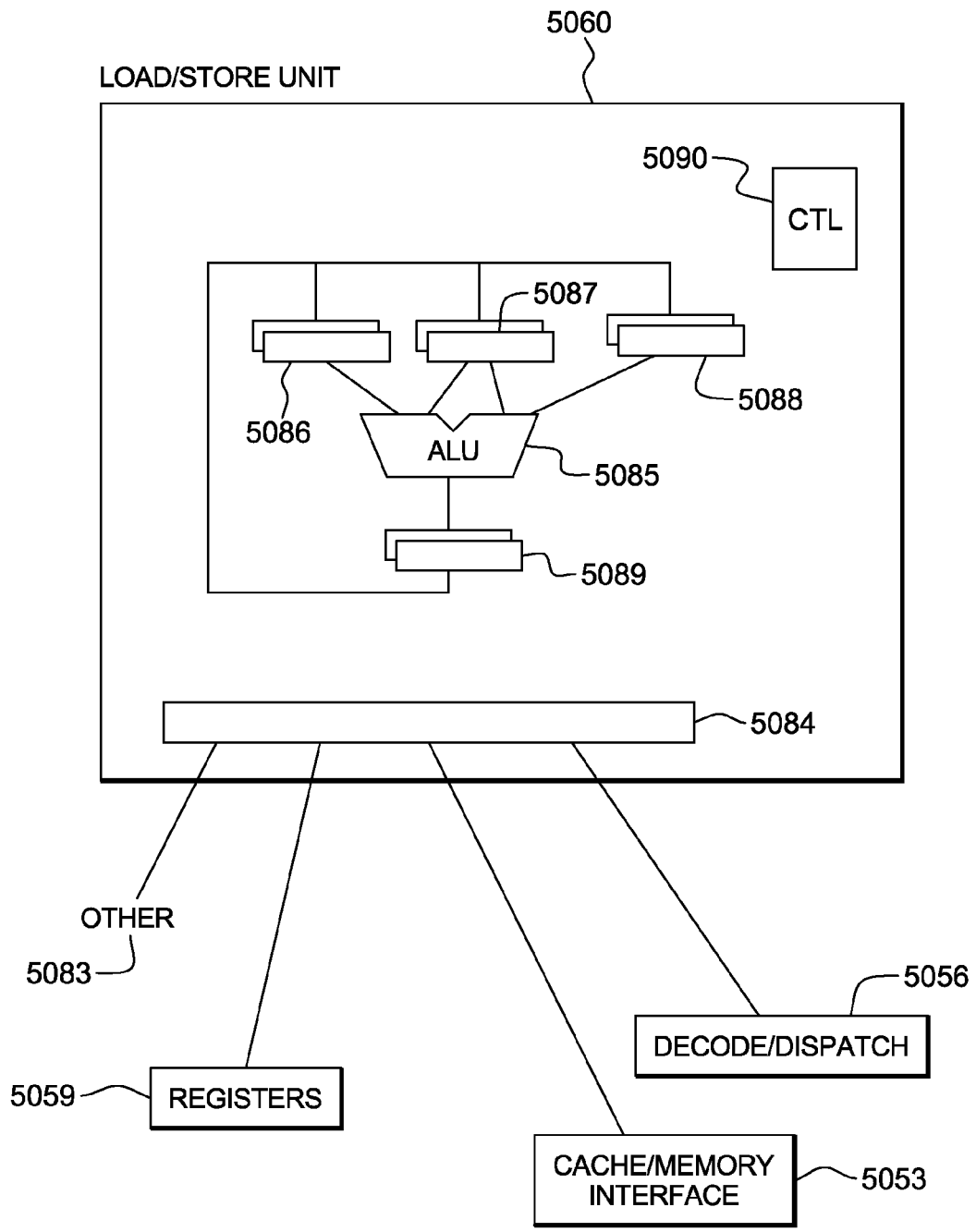
FIG. 18C depicts one embodiment of the load/store unit of the computer system of FIG. 17 to incorporate and use one or more aspects of the present invention.

Referring to FIG. 18C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multiprocessor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 17) provide the processor with means for attaching to peripheral devices including tape, disc, printers, displays, and networks for example. I/O units are often presented to the computer program by software drivers. In mainframes, such as the System z® from IBM®, channel adapters and open system adapters are I/O units of the mainframe that provide the communications between the operating system and peripheral devices.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture®, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 19:
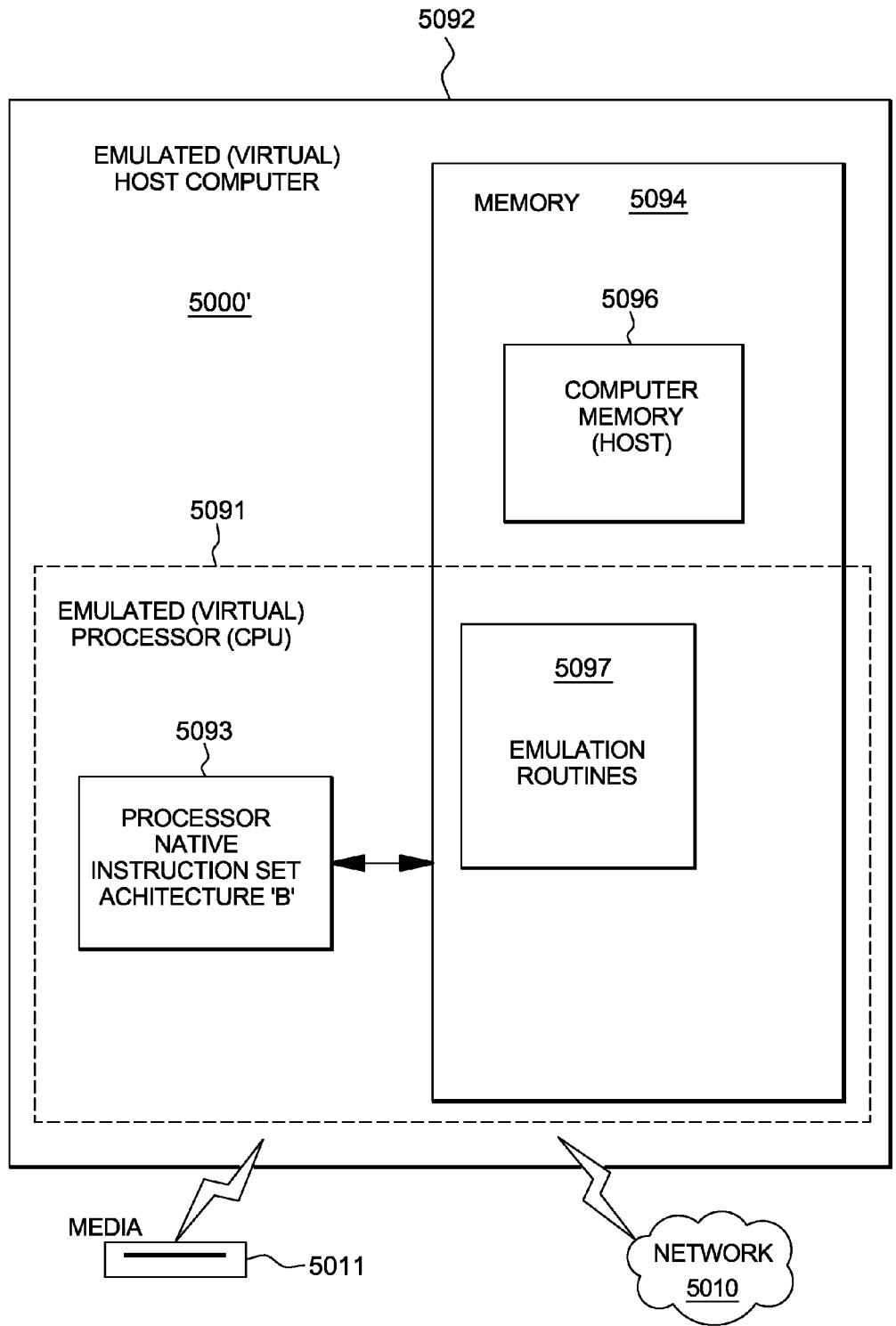
FIG. 19 depicts one embodiment of an emulated host computer system to incorporate and use one or more aspects of the present invention.

In FIG. 19, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for managing address spaces in a computing environment, the computer program product including:
   a non-transitory computer readable storage medium readable by a processing circuit and storing instructions for execution by the processing circuit for performing a method comprising:
      concurrent to an adapter accessing a direct memory access (DMA) address space located within system memory external to the adapter, performing a) and b):
      a) updating a DMA address space limit, based on executing, by a processor, a Modify PCI Function Controls (MPFC) instruction re-register function that includes a handle for locating an adapter, the MPFC instruction specifying a new DMA address space limit corresponding to the DMA address space, the new DMA address space limit representing a change in size of the DMA address space located within system memory, and wherein the new DMA address space limit is an explicit limit used by hardware to control a range of addresses defining the DMA address space; and
      b) informing the adapter that the DMA address space limit has changed, wherein based on a change in size of the DMA address space, the method further comprises:
         determining whether a number of levels of address translation tables is to be changed, based on the change in size of the DMA address space; and
         based on the determining, performing one of:
            based on determining the number of levels of address translation tables is to be changed, increasing or decreasing the number of levels of address translation tables; or
            based on determining the number of levels of address translation tables is not to be changed, maintaining the number of levels of address translation tables.

2. The computer program product of claim 1, wherein the determining determines that the number of levels of address translation tables is to be changed, and wherein:
   based on determining the number of levels of address translation tables is to be changed, increasing or decreasing the number of levels of address translation tables; and
   based on the number of levels of address translation tables changing, issuing the MPFC instruction to adjust a pointer to access an address translation table of one level to point to another address translation table at another level.

3. The computer program product of claim 1, wherein concurrent to the adapter accessing the DMA address space, increasing the size of the DMA address space, the increasing comprising:
   adding memory to the DMA address space; and
   updating the new DMA address space limit that defines an outer bound of the DMA address space.

4. The computer program product of claim 3, wherein based on executing the MPFC instruction, the MPFC instruction specifying an input/output (I/O) address translation pointer to access an address translation table and a translation format, and based on increasing the size of the DMA address space:
   determining whether one or more additional levels of address translation tables are to be employed in translating addresses used to access memory of the DMA address space;
   initializing one or more new address translation tables, based on determining one or more additional levels of address translation tables are to be employed;
   updating the I/O address translation pointer to point to one new address translation table of the one or more new address translation tables, based on initializing one or more new address translation tables; and
   updating the translation format, based on updating the I/O address translation pointer.

5. The computer program product of claim 4, wherein the new DMA address space limit is updated subsequent to updating the I/O address translation pointer, based on determining one or more additional levels of address translation tables are to be employed.

6. The computer program product of claim 4, wherein the I/O address translation pointer and new DMA address space limit are included in a device table entry corresponding to the DMA address space.

7. The computer program product of claim 1, wherein a no address translation table format is used to access memory of the DMA address space prior to resizing, and wherein based on increasing the size of the DMA address space, one or more address translation tables are to be used.

8. The computer program product of claim 1, wherein concurrent to the adapter accessing the DMA address space, decreasing the size of the DMA address space.

9. The computer program product of claim 8, wherein the decreasing comprises:
   removing memory from the DMA address space; and
   updating the new DMA address space limit to define an outer bound of the address space.

10. The computer program product of claim 9, wherein based on executing the MPFC instruction, the MPFC instruction specifying an input/output (I/O) address translation pointer to access an address translation table and a translation format, and based on decreasing the size of the DMA address space:
   determining whether one or more existing levels of address translation tables are not to be employed in translating addresses used to access memory of the DMA address space;
   updating the I/O address translation pointer, based on determining one or more levels of address translation tables are not to be employed; and
   updating the translation format, based on updating the I/O address translation pointer.

11. The computer program product of claim 10, wherein based on decreasing the size of the DMA address space:
   determining whether one or more entries corresponding to the DMA address space exist in a cache; and
   purging the cache of at least the one or more entries, based on determining the one or more entries exist.

12. The computer program product of claim 8, wherein one or more address translation tables are used to translate an address used to access memory of the DMA address space prior to resizing, and wherein based on decreasing the size of the address space, the one or more address translation tables are not needed.

13. A computer system for managing address spaces in a computing environment, the computer system including:
   a memory; and
   a processor in communications with the memory, wherein the computer system is configured to perform a method, said method comprising:
      concurrent to an adapter accessing a direct memory access (DMA) address space located within system memory external to the adapter, performing a) and b):
         a) updating a DMA address space limit, based on executing, by a processor, a Modify PCI Function Controls (MPFC) instruction re-register function that includes a handle for locating an adapter, the MPFC instruction specifying a new DMA address space limit corresponding to the DMA address space, the new DMA address space limit representing a change in size of the DMA address space located within system memory, and wherein the new DMA address space limit is an explicit limit used by hardware to control a range of addresses defining the DMA address space; and
         b) informing the adapter that the DMA address space limit has changed, wherein based on a change in size of the DMA address space, the method further comprises:
            determining whether a number of levels of address translation tables is to be changed, based on the change in size of the DMA address space; and
            based on the determining, performing one of:
               based on determining the number of levels of address translation tables is to be changed, increasing or decreasing the number of levels of address translation tables; or
               based on determining the number of levels of address translation tables is not to be changed, maintaining the number of levels of address translation tables.

14. The computer system of claim 13, wherein concurrent to the adapter accessing the DMA address space, increasing the size of the DMA address space, the increasing comprising:
   adding memory to the DMA address space; and
   updating the new DMA address space limit that defines an outer bound of the DMA address space.

15. The computer system of claim 14, wherein based on executing the MPFC instruction, the MPFC instruction specifying an input/output (I/O) address translation pointer to access an address translation table and a translation format, and based on increasing the size of the DMA address space:
   determining whether one or more additional levels of address translation tables are to be employed in translating addresses used to access memory of the DMA address space;
   initializing one or more new address translation tables, based on determining one or more additional levels of address translation tables are to be employed;
   updating the I/O address translation pointer to point to one new address translation table of the one or more new address translation tables, based on initializing one or more new address translation tables; and
   updating the translation format, based on updating the I/O address translation pointer.

16. The computer system of claim 15, wherein the I/O address translation pointer and new DMA address space limit are included in a device table entry corresponding to the DMA address space.

17. The computer system of claim 13, wherein concurrent to the adapter accessing the DMA address space, decreasing the size of the DMA address space, the decreasing comprising:
   removing memory from the DMA address space; and
   updating the new DMA address space limit to define an outer bound of the address space.

18. The computer system of claim 17, wherein based on executing the MPFC instruction, the MPFC instruction specifying an input/output (I/O) address translation pointer to access an address translation table and a translation format, and based on decreasing the size of the DMA address space:
   determining whether one or more existing levels of address translation tables are not to be employed in translating addresses used to access memory of the DMA address space;
   updating the I/O address translation pointer, based on determining one or more levels of address translation tables are not to be employed; and
   updating the translation format, based on updating the I/O address translation pointer.

19. The computer system of claim 18, wherein based on decreasing the size of the DMA address space:
   determining whether one or more entries corresponding to the DMA address space exist in a cache; and purging the cache of at least the one or more entries, based on determining the one or more entries exist.

20. A method of managing address spaces in a computing environment, the method including:
concurrent to an adapter accessing a direct memory access (DMA) address space located within system memory external to the adapter, performing a) and b):
a) updating a DMA address space limit, based on executing, by a processor, a Modify PCI Function Controls (MPFC) instruction re-register function that includes a handle for locating an adapter, the MPFC instruction specifying a new DMA address space limit corresponding to the DMA address space, the new DMA address space limit representing a change in size of the DMA address space located within system memory, and wherein the new DMA address space limit is an explicit limit used by hardware to control a range of addresses defining the DMA address space; and
b) informing the adapter that the DMA address space limit has changed, wherein based on a change in size of the DMA address space, the method further comprises:
determining whether a number of levels of address translation tables is to be changed, based on the change in size of the DMA address space; and
based on the determining, performing one of:
based on determining the number of levels of address translation tables is to be changed, increasing or decreasing the number of levels of address translation tables; or
based on determining the number of levels of address translation tables is not to be changed, maintaining the number of levels of address translation tables.

21. The method of claim 20, wherein based on executing the MPFC instruction, the MPFC instruction specifying an input/output (I/O) address translation pointer to access an address translation table and a translation format, and based on the size of the DMA address space increasing, the increasing comprises:
adding memory to the DMA address space;
updating the new DMA address space limit that defines an outer bound of the DMA address space;
determining whether one or more additional levels of address translation tables are to be employed in translating addresses used to access memory of the DMA address space;
initializing one or more new address translation tables, based on determining one or more additional levels of address translation tables are to be employed;
updating the I/O address translation pointer to point to one new address translation table of the one or more new address translation tables, based on initializing one or more new address translation tables; and
updating the translation format, based on updating the I/O address translation pointer.

22. The method of claim 20, wherein based on executing the MPFC instruction, the MPFC instruction specifying an input/output (I/O) address translation pointer to access an address translation table and a translation format, and based on the size of the DMA address space is decreasing, the decreasing comprises:
removing memory from the DMA address space;
updating the new DMA address space limit to define an outer bound of the address space;
determining whether one or more existing levels of address translation tables are not to be employed in translating addresses used to access memory of the DMA address space;
updating the I/O address translation pointer, based on determining one or more levels of address translation tables are not to be employed;
updating the translation format, based on updating the I/O address translation pointer;
determining whether one or more entries corresponding to the DMA address space exist in a cache; and
purging the cache of at least the one or more entries, based on determining the one or more entries exist.

* * * * *